United States Patent
Wang

(10) Patent No.: US 12,537,184 B2
(45) Date of Patent: Jan. 27, 2026

(54) ELECTROCHEMICAL DEVICE AND ELECTRONIC DEVICE

(71) Applicant: NINGDE AMPEREX TECHNOLOGY LIMITED, Ningde (CN)

(72) Inventor: Kefei Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 888 days.

(21) Appl. No.: 17/055,628

(22) PCT Filed: Mar. 3, 2020

(86) PCT No.: PCT/CN2020/077578
§ 371 (c)(1),
(2) Date: Nov. 16, 2020

(87) PCT Pub. No.: WO2021/174410
PCT Pub. Date: Sep. 10, 2021

(65) Prior Publication Data
US 2022/0052319 A1    Feb. 17, 2022

(51) Int. Cl.
*H01M 4/66*    (2006.01)
*H01M 4/36*    (2006.01)
(Continued)

(52) U.S. Cl.
CPC .......... *H01M 4/364* (2013.01); *H01M 4/366* (2013.01); *H01M 4/661* (2013.01); *H01M 4/663* (2013.01);
(Continued)

(58) Field of Classification Search
CPC ...... H01M 4/364; H01M 4/366; H01M 4/661; H01M 4/663; H01M 10/0567;
(Continued)

(56) References Cited

U.S. PATENT DOCUMENTS

| | | | |
|---|---|---|---|
| 2006/0222952 A1* | 10/2006 | Kono | H01M 4/5825 429/231.95 |
| 2015/0050558 A1* | 2/2015 | Hampel | C25D 5/605 205/95 |

(Continued)

FOREIGN PATENT DOCUMENTS

| | | |
|---|---|---|
| CN | 101364645 A | 2/2009 |
| CN | 201985201 U | 9/2011 |

(Continued)

OTHER PUBLICATIONS

Machine translation of CN 108315606, retrieved from <www.espacenet.com> on Oct. 25, 2023.*

(Continued)

*Primary Examiner* — Cynthia K Walls
(74) *Attorney, Agent, or Firm* — XSENSUS LLP

(57) ABSTRACT

An electrochemical device, including a cathode, an anode and an electrolyte. The cathode includes a cathode current collector and a cathode mixture layer formed on the cathode current collector. A dyne value of the cathode current collector is 25 dyn/cm to 31 dyn/cm. Burrs are provided on an edge of the cathode mixture layer, and a length of the burrs is not greater than 4 mm. The electrochemical device has improved cycle performance.

20 Claims, 2 Drawing Sheets

(51) Int. Cl.
    *H01M 10/0567* (2010.01)
    *H01M 10/0569* (2010.01)
(52) U.S. Cl.
    CPC ... *H01M 10/0567* (2013.01); *H01M 10/0569* (2013.01)
(58) Field of Classification Search
    CPC ......... H01M 10/0569; H01M 10/0525; H01M 4/525; H01M 4/62; H01M 2004/028; H01M 4/131; Y02E 60/10
    See application file for complete search history.

(56) References Cited

U.S. PATENT DOCUMENTS

| | | | | |
|---|---|---|---|---|
| 2015/0132647 | A1* | 5/2015 | Kato | H01M 4/62 252/182.1 |
| 2016/0149265 | A1* | 5/2016 | Onozaki | H01M 10/0568 429/337 |
| 2018/0366775 | A1* | 12/2018 | Tao | H01M 10/0525 |
| 2019/0305291 | A1 | 10/2019 | Morikawa et al. | |

FOREIGN PATENT DOCUMENTS

| | | | |
|---|---|---|---|
| CN | 108315606 | A | 7/2018 |
| CN | 108767258 | A | 11/2018 |
| CN | 09309226 | A | 2/2019 |
| CN | 109792085 | A | 5/2019 |
| JP | 2004281234 | A | 10/2004 |
| JP | 2011076824 | A | 4/2011 |
| JP | 2013256700 | A | 12/2013 |
| JP | 2015138687 | A | 7/2015 |
| JP | 2015523674 | A | 8/2015 |
| JP | 2016038962 | A | 3/2016 |
| JP | 2018049715 | A | 3/2018 |
| JP | 2019207755 | A | 12/2019 |
| WO | 2019101723 | A1 | 5/2019 |
| WO | 2019101730 | A1 | 5/2019 |

OTHER PUBLICATIONS

Machine translation of CN 201985201, retrieved from <www.espacenet.com> on Oct. 25, 2023.*
Machine translation of JP 2016-038962, retrieved from <www.espacenet.com> on Oct. 25, 2023.*
Machine translation of CN 109309226, retrieved from <www.espacenet.com> on Oct. 25, 2023.*
Chinese Notification of Grant of Patent Right and Notification of Registration of Patent Right, mailed Oct. 25, 2021 in counterpart Chinese application CN202010139071.5, 4 pages in Chinese.
Japanese First Office Action mailed Apr. 4, 2023 in counterpart Japanese application JP2022550425A, 4 pages in Japanese.
Chinese Second Office Action mailed May 7, 2021 in counterpart Chinese application CN202010139071.5, 9 pages.
PCT International Search Report mailed Dec. 9, 2020 in counterpart PCT application PCT/CN2020/077578, 4 pages in Chinese.
Chinese First Office Action mailed Dec. 2, 2020 in counterpart Chinese application CN202010139071.5, 10 pages.

* cited by examiner

ELECTROCHEMICAL DEVICE AND ELECTRONIC DEVICE

CROSS REFERENCE TO THE RELATED APPLICATION

The present application is a National Stage application of PCT international application PCT/CN2020/077578, filed on 3 Mar. 2020, the entire content of which is incorporated herein with reference.

BACKGROUND

1. Technical Field

The present application relates to the field of energy storage, in particular to an electrochemical device and an electronic device, and more particularly to a lithium-ion battery.

2. Description of the Related Art

With the development of technologies and the increasing demands for mobile devices, the demand by people for electrochemical devices (for example, lithium-ion batteries) has increased significantly, so that higher requirements are needed for better performance of the lithium-ion batteries, particularly for the cycle performance of the lithium-ion batteries.

The performance of the lithium-ion batteries mainly depends on the characteristics of electrodes, electrolyte and separators. The performance of the electrodes depends on the characteristics of current collectors and mixture layers, and is also closely related to auxiliary agents in the mixture layers. The auxiliary agents play a crucial role in the dispersing of particles inside the mixture layers or bonding of interfaces. During preparation of the lithium-ion batteries, the problems of difficulty in proportioning and the like caused by poor compatibility of raw materials are generally encountered, which may adversely affect the performance of the lithium-ion batteries.

In view of this, it is indeed necessary to provide an improved electrochemical device with excellent cycle performance.

SUMMARY

The embodiments of the present application provide an electrochemical device and an electronic device to solve at least one of the problems existing in the related art at least to some extent.

In an aspect of the present application, the present application provides an electrochemical device, including a cathode, an anode and an electrolyte, the cathode includes a cathode current collector and a cathode mixture layer formed on the cathode current collector, a dyne value of the cathode current collector is 25 dyn/cm to 31 dyn/cm, there are burrs on an edge of the cathode mixture layer, and a length of the burrs is not greater than 4 mm.

According to embodiments of the present application, the dyne value of the cathode current collector is 26 dyn/cm to 30 dyn/cm, and the length of the burrs is not greater than 3 mm.

According to embodiments of the present application, the edge of the cathode mixture layer is an edge of a starting end or an ending end along a coating direction.

According to embodiments of the present application, an end part of the cathode mixture layer and an end part of the cathode current collector form a step.

According to embodiments of the present application, a ratio of a length of the burrs to a thickness of the cathode current collector is not greater than 300.

According to embodiments of the present application, a ratio of a thickness of the cathode mixture layer on one side of the cathode current collector to a thickness of the cathode current collector is not greater than 22.

According to embodiments of the present application, a thickness of the cathode current collector is 1 µm to 1 mm.

According to embodiments of the present application, the cathode current collector includes a plurality of microcrystals, the microcrystals include at least one of aluminum microcrystals or aluminum alloy microcrystals, and the microcrystals have a cross section area of not greater than 100 µm$^2$.

According to embodiments of the present application, the cathode current collector is selected from a metal material or a carbon material, and the metal material includes at least one of aluminum, aluminum alloy, nickel plated aluminum, stainless steel, titanium or tantalum.

According to embodiments of the present application, the cathode mixture layer includes a surfactant, based on a total weight of the cathode mixture layer, a content of the surfactant is not greater than 0.5 wt %, and the surfactant has a hydrophilic-lipophilic balance (HLB) value of 2 to 10.

According to embodiments of the present application, the surfactant includes at least one of a polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, 4,5-polyoxyethylene sorbitan-4, 5-oleate, glycerin monostearate, hydroxylated lanolin, sorbitan monooleate, propylene glycol monolaurate, sorbitan monostearate, diethylene glycol monooleate, diethylene glycol monostearate, diethylene glycol fatty acid ester, polyoxyethylene (2EO) oleyl alcohol, methyl glucoside seequisterate, diethylene glycol monolaurate, sorbitan monopalmitate, polyoxyethylene dioleate, tetraethylene glycol monostearate, tetraethylene glycol monooleate, polyoxypropylene mannitol dioleate, a polyoxyethylene sorbitol lanolin oleate derivative, a polyoxyethylene sorbitol lanolin derivative, polyoxypropylene stearate, polyoxyethylene (5EO) lanolin alcohol, sorbitan laurate, polyoxyethylene fatty acid, polyoxyethylene oxypropylene oleate, tetraethylene glycol monolaurate, polyoxyethylene lauryl ether, polyoxyethylene (4EO) sorbitan monostearate, hexaethylene glycol monostearate, propoxylated (5PO) lanolin alcohol, or polyoxyethylene (5EO) sorbitan monooleate.

According to embodiments of the present application, the cathode mixture layer includes N-methylpyrrolidone, and based on a total weight of the cathode mixture layer, a content of the N-methylpyrrolidone is not greater than 100 ppm.

According to embodiments of the present application, the electrolyte includes at least one of the following compounds:
(a) a compound with a cyano group(s);
(b) lithium difluorophosphate; or
(c) a compound of Formula 1:

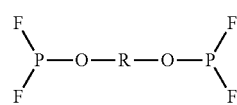

Formula 1 wherein R is a substituted or unsubstituted $C_1$-$C_{10}$ alkyl, and when substituted, a substituent group is halogen.

According to embodiments of the present application, the electrolyte includes a compound with a cyano group(s), and the compound with a cyano group(s) includes at least one of butanedinitrile, glutaronitrile, adiponitrile, 1,5-dicyanopentane, 1,6-dicyanohexane, tetramethylsuccinonitrile, 2-methyl pentanedinitrile, 2,4-dimethyl pentanedinitrile, 2,2,4,4-tetramethyl pentanedinitrile, 1,4-dicyanopentane, 1,2-dicyanobenzene, 1,3-dicyanobenzene, 1,4-dicyanobenzene, ethylene glycol bis(propionitrile)ether, 3,5-dioxa-heptanedinitrile, 1,4-bis(cyanoethoxy)butane, diethylene glycol bis(2-cyanoethyl)ether, triethylene glycol bis(2-cyanoethyl) ether, tetraethylene glycol bis(2-cyanoethyl)ether, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxy methylene)ethane, 1,1,1-tris(cyanoethoxy methylene)propane, 3-methyl-1,3,5-tris(cyanoethoxy)pentane, 1,2,7-tris(cyanoethoxy)heptane, 1,2,6-tris(cyanoethoxy)hexane, or 1,2,5-tris(cyanoethoxy)pentane.

According to embodiments of the present application, the electrolyte includes the compound of Formula 1, and the compound of Formula 1 includes at least one of 1,2-bis(difluorophosphanyl oxy)ethane, 1,2-bis(difluorophosphanyl oxy)propane or 1,2-bis(difluorophosphanyl oxy)butane.

According to embodiments of the present application, the electrolyte includes a carboxylic ester, a content X mg of the carboxylic ester in the electrolyte and a reaction area Y m² of the cathode mixture layer meet the following relationship: $10 \leq (X/Y) \leq 100$.

According to embodiments of the present application, the carboxylic ester includes at least one of a chain carboxylic ester and a cyclic carboxylic ester.

According to embodiments of the present application, the carboxylic ester includes at least one of the following: γ-butyrolactone, γ-valerolactone, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, or ethyl pivalate.

In another aspect of the present application, the present application provides an electronic device, including the electrochemical device according to the present application.

Additional aspects and advantages of the embodiments of the present application will be partially described or shown in the following description or interpreted by implementing the embodiments of the present application.

DETAILED DESCRIPTION

Figure 1:
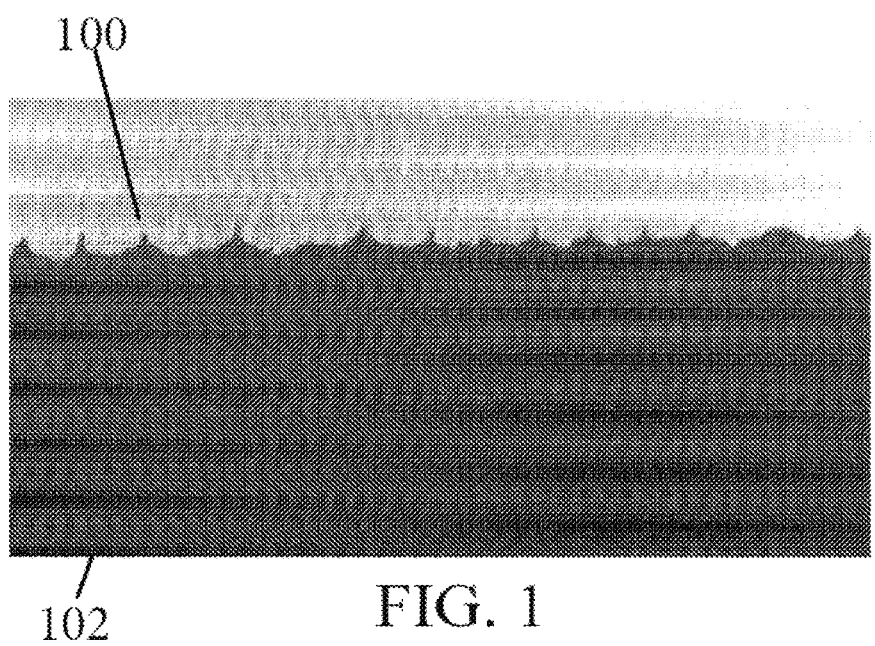
FIG. 1 shows a morphological diagram of a cathode of Comparative Example 1.

Embodiments of the present application will be described in detail below. The embodiments of the present application should not be interpreted as limiting the present application.

Unless otherwise expressly indicated, the following terms used herein have the meanings indicated below.

In specific implementations and claims, a list of items connected by the term "at least one of" may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (excluding C); A and C (excluding B); B and C (excluding A); or A, B, and C. Item A may include a single element or multiple elements. Item B may include a single element or multiple elements. Item C may include a single element or multiple elements. The term "at least one type of" and the term "at least one of" have the same meaning.

As used herein, the term "hydrocarbyl" encompasses alkyl, alkenyl, and alkynyl.

As used herein, the term "alkyl" is intended to be a straight-chain saturated hydrocarbon structure having 1 to 20 carbon atoms. The "alkyl" is also intended to be a branched-chain or cyclic hydrocarbon structure having 3 to 20 carbon atoms. When an alkyl having a specific number of carbon atoms is specified, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl include, but are not limited to, methyl, ethyl, n-propyl, isopropyl, cyclopropyl, n-butyl, isobutyl, sec-butyl, tert-butyl, cyclobutyl, n-pentyl, isopentyl, neopentyl, cyclopentyl, methylcyclopentyl, ethylcyclopentyl, n-hexyl, isohexyl, cyclohexyl, n-heptyl, octyl, cyclopropyl, cyclobutyl, norbornenyl, etc.

As used herein, the term "alkenyl" refers to a monovalent unsaturated hydrocarbyl group which may be straight or branched and has at least one and usually 1, 2 or 3 carbon-carbon double bonds. Unless otherwise defined, the alkenyl generally contains 2 to 20 carbon atoms and includes (for example) —$C_{2-4}$ alkenyl, —$C_{2-6}$ alkenyl and —$C_{2-10}$ alkenyl. Representative alkenyl includes (for example) ethenyl, n-propenyl, isopropenyl, n-but-2-enyl, but-3-enyl, n-hex-3-enyl, etc.

As used herein, the term "alkynyl" refers to a monovalent unsaturated hydrocarbyl group which may be straight or branched and has at least one and usually 1, 2 or 3 carbon-carbon triple bonds. Unless otherwise defined, the alkynyl group generally contains 2 to 20 carbon atoms and includes (for example) —$C_{2-4}$ alkynyl, —$C_{3-6}$ alkynyl and —$C_{3-10}$ alkynyl. Representative alkynyl includes (for example) ethynyl, prop-2-ynyl (n-propynyl), n-but-2-ynyl, n-hex-3-ynyl, etc.

As used herein, the term "cyano" encompasses —CN and an organic substance containing the organic group —CN.

As used herein, the term "halogen" refers to a stable atom belonging to Group 17 of the periodic table of elements (for example, fluorine, chlorine, bromine or iodine).

An electrode (cathode or anode) of an electrochemical device (for example, a lithium-ion battery) is generally prepared by a following method: mixing an active material, a conductive agent, a thickening agent, an adhesive and a solvent; and then, coating mixed slurry onto a current collector. However, the compatibility between the solvent and the adhesive or between the solvent and the active material is generally poor, so that proportioning is difficult. Additionally, a theoretical capacity of the electrochemical device may change along with the types of the active material. As a cycle progresses, the electrochemical device usually generates a phenomenon of charge/discharge capacity reduction. This is because an electrode interface of the electrochemical device changes in a charge and/or discharge process, resulting in function realization incapability of the active material of the electrode.

The present application ensures the interface stability of the electrochemical device in the cycle process by using a specific cathode material, thus improving the cycle performance of the electrochemical device. The specified cathode material of the present application is realized by controlling the dyne value of the cathode current collector (the dyne value of the cathode current collector can represent the surface tension of the cathode current collector) and the length of edge burrs of the cathode mixture layer.

In one embodiment, the present application provides an electrochemical device, including a cathode, an anode and an electrolyte as described below.

I. Cathode

The cathode includes a cathode current collector and a cathode mixture layer disposed on one or two surfaces of the cathode current collector.

1. Cathode Current Collector

In embodiments of the present application, a dyne value of the cathode current collector is 25 dyn/cm to 31 dyn/cm. In some embodiments, the dyne value of the cathode current collector is 26 dyn/cm to 30 dyn/cm. The dyne value of the cathode current collector is 25 dyn/cm, 26 dyn/cm, 27 dyn/cm, 28 dyn/cm, 29 dyn/cm, 30 dyn/cm or 31 dyn/cm. When the dyne value of the cathode current collector is within the above range, the coating requirements of the cathode mixture layer can be met, and the capacity retention of the electrochemical device in the cycle process is facilitated.

The dyne value of the cathode current collector may be realized by controlling a manufacturing process, and for example, may be realized by methods of regulating the types and consumption of aluminum foil rolling oil and additives, controlling an annealing temperature, performing plasma processing and the like.

The dyne value of the cathode current collector may be measured by the following method: drawing a line on a surface of the cathode current collector by a dyne pen; and after 2 to 3 seconds, observing whether shrinkage occurs or not and whether the line is condensed into water drop points or not. If the line is shrunk and is condensed into water drops, a dyne pen with a lower value is used to draw a straight line until no shrinkage and no water drop so as to determine a surface tension value of an object. Each sample is at least measured 3 times, abnormal points are eliminated, and an average value is taken as the dyne value of the cathode current collector.

The type of the cathode current collector is not particularly limited, and the cathode current collector may be any known material applicable to the cathode current collector. Examples of the cathode current collector may include, but are not limited to, at least one of aluminum, aluminum alloy, nickel plated aluminum, stainless steel, titanium or tantalum; and carbon materials such as carbon cloth and carbon paper. In some embodiments, the cathode current collector is a metal material. In some embodiments, the cathode current collector is aluminum.

In some embodiments, the cathode current collector includes a plurality of microcrystals, the microcrystals include at least one of aluminum microcrystals or aluminum alloy microcrystals. In some embodiments, the microcrystals have a cross section area of not greater than 100 $\mu m^2$. In some embodiments, the microcrystals have a cross section area of not greater than 90 $\mu m^2$. In some embodiments, the microcrystals have a cross section area of not greater than 80 $\mu m^2$. In some embodiments, the microcrystals have a cross section area of not greater than 70 $\mu m^2$. In some embodiments, the microcrystals have a cross section area of not greater than 60 $\mu m^2$.

In some embodiments, the cathode current collector includes a surface modified aluminum foil, for example, an aluminum foil treated by plasma equipment. By using the surface modified aluminum foil, surface layer oil stains can be effectively removed, so that the surface cleanness is obviously improved. Meanwhile, in a deep cleaning process, the surface of the aluminum foil is activated, so that the hydrophilic performance is enhanced. Additionally, an aluminum oxide passivation layer on a surface layer of the aluminum foil can be effectively broken through by plasma glow discharge, so that the conductivity of the aluminum foil is improved, and the interface contact resistance becomes small. Additionally, the surface roughness of the modified aluminum foil is increased, and the specific surface area is increased, so that the adhesive strength between the cathode mixture layer and the aluminum foil is improved, thereby improving the performance of the electrochemical device.

The form of the cathode current collector is not particularly limited. When the cathode current collector is a metal material, the form of the cathode current collector may include, but is not limited to, a metal foil, a metal cylinder, a metal coiled strip, a metal plate, a metal film, a metal lathing, stamped metal, foamed metal, etc. When the cathode current collector is a carbon material, the form of the cathode current collector may include, but is not limited to, a carbon plate, a carbon film, a carbon cylinder, etc. In some embodiments, the cathode current collector is a metal film. In some embodiments, the metal film is reticular.

The thickness of the cathode current collector is not particularly limited. In some embodiments, the thickness of the cathode current collector is 1 $\mu m$ to 1 mm. In some embodiments, the thickness of the cathode current collector is 3 $\mu m$ to 800 $\mu m$. In some embodiments, the thickness of the cathode current collector is 5 $\mu m$ to 500 $\mu m$. In some embodiments, the thickness of the cathode current collector is 10 $\mu m$ to 300 $\mu m$. In some embodiments, the thickness of the cathode current collector is 50 $\mu m$ to 200 $\mu m$. In some embodiments, the thickness of the cathode current collector is 1 $\mu m$, 3 $\mu m$, 5 $\mu m$, 10 $\mu m$, 15 $\mu m$, 20 $\mu m$, 30 $\mu m$, 50 $\mu m$, 100 $\mu m$, 200 $\mu m$, 300 $\mu m$, 500 $\mu m$, 800 $\mu m$ or 1000 $\mu m$. In some embodiments, the thickness of the cathode current collector is within a range formed by any two of the above values.

In order to reduce the electron contact resistance of the cathode current collector and a cathode active material layer, the surface of the cathode current collector may include a conductive auxiliary agent. Examples of the conductive auxiliary agent may include, but are not limited to, carbon and precious metal such as gold, platinum and silver.

2. Cathode Mixture Layer

Figure 2:
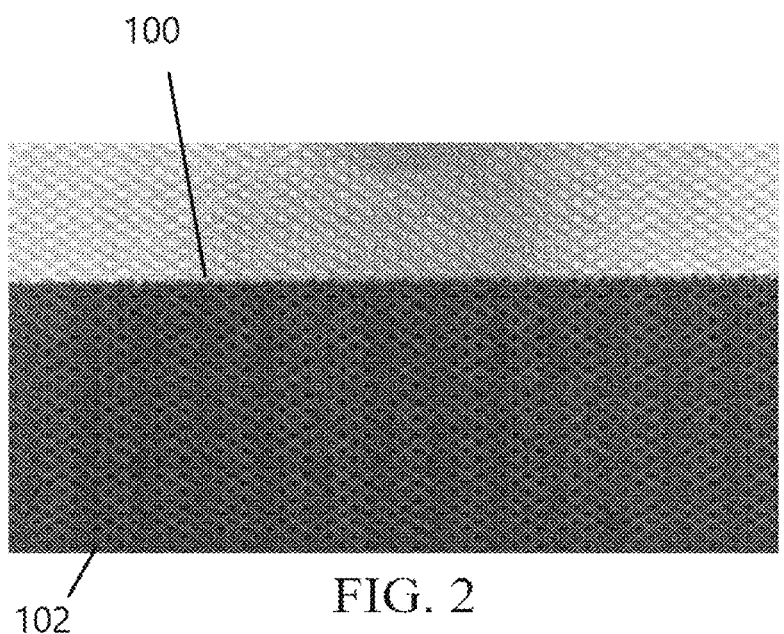
FIG. 2 shows a morphological diagram of a cathode of Example 3 of the present application.

In embodiments of the present application, there are burrs on an edge of the cathode mixture layer, and the length of the burrs is not greater than 4 mm. In some embodiments, the length of the burrs is not greater than 3 mm. In some embodiments, the length of the burrs is not greater than 2 mm. In some embodiments, the length of the burrs is not greater than 1 mm. When the length of the burrs on the edge of the cathode mixture layer is within the above range, a tailing phenomenon (i.e., a phenomenon that a small amount of coating slurry leaves behind from a main body coating region) of the cathode mixture layer during coating can be obviously alleviated, and the improvement of the cycle performance of the electrochemical device is facilitated. As shown in FIG. 1, there are long burrs 100 on an edge of a cathode mixture layer 102 in the prior art. FIG. 2 shows a morphological diagram of a cathode of Example 3 of the present application, wherein the edge of the cathode mixture 102 is flat, and the length of the burrs 100 is small.

The length of the burrs on the edge of the cathode mixture layer may also be realized by controlling the leveling property of cathode slurry. As a control method of the leveling property of the cathode slurry, the control may be realized by adding an auxiliary agent into the cathode slurry or disposing an auxiliary agent coating on a surface of a cathode active material layer.

The length of the burrs on the edge of the cathode mixture layer may be determined by a following method: measuring the distance from a farthest tailing point of the cathode mixture layer to a main body of the cathode mixture layer by a caliper in a gap position of the cathode mixture layer, and reading caliper data as the length of the burrs.

The edge of the cathode mixture layer may be an edge in any direction. In some embodiments, the edge of the cathode mixture layer is an edge of a starting end or an ending end along a coating direction.

In some embodiments, an end part of the cathode mixture layer and an end part of the cathode current collector form a step. That is, a region not provided with a cathode mixture layer is formed on the cathode current collector.

In some embodiments, a ratio of the length of the burrs on the edge of the cathode mixture layer to the thickness of the cathode current collector is not greater than 300. In some embodiments, the ratio of the length of the burrs on the edge of the cathode mixture layer to the thickness of the cathode current collector is not greater than 250. In some embodiments, the ratio of the length of the burrs on the edge of the cathode mixture layer to the thickness of the cathode current collector is not greater than 200. In some embodiments, the ratio of the length of the burrs on the edge of the cathode mixture layer to the thickness of the cathode current collector is not greater than 150. In some embodiments, the ratio of the length of the burrs on the edge of the cathode mixture layer to the thickness of the cathode current collector is not greater than 100. When the ratio of the length of the burrs on the edge of the cathode mixture layer to the thickness of the cathode current collector is within the above range, the capacity retention of the electrochemical device in the cycle process is facilitated.

In some embodiments, a ratio of the thickness of the cathode mixture layer at one side of the cathode current collector to the thickness of the cathode current collector is not greater than 22. In some embodiments, the ratio of the thickness of the cathode mixture layer at one side of the cathode current collector to the thickness of the cathode current collector is not greater than 20. In some embodiments, the ratio of the thickness of the cathode mixture layer at one side of the cathode current collector to the thickness of the cathode current collector is not greater than 15. In some embodiments, the ratio of the thickness of the cathode mixture layer at one side of the cathode current collector to the thickness of the cathode current collector is not greater than 10. In some embodiments, the ratio of the thickness of the cathode mixture layer at one side of the cathode current collector to the thickness of the cathode current collector is not smaller than 0.5. In some embodiments, the ratio of the thickness of the cathode mixture layer at one side of the cathode current collector to the thickness of the cathode current collector is not smaller than 0.8. In some embodiments, the ratio of the thickness of the cathode mixture layer at one side of the cathode current collector to the thickness of the cathode current collector is not smaller than 1. In some embodiments, the ratio of the thickness of the cathode mixture layer at one side of the cathode current collector to the thickness of the cathode current collector is not smaller than 3. In some embodiments, the ratio of the thickness of the cathode mixture layer at one side of the cathode current collector to the thickness of the cathode current collector is within a range formed by any two of the above values. When the ratio of the thickness of the cathode mixture layer at one side of the cathode current collector to the thickness of the cathode current collector is within the above range, a heat release phenomenon of the cathode current collector of the electrochemical device in a high-current-density charge and discharge process can be inhibited, and the capacity of the electrochemical device is favorably ensured.

In some embodiments, the cathode mixture layer includes a surfactant, based on the total weight of the cathode mixture layer, the content of the surfactant is not greater than 0.5 wt %. In some embodiments, based on the total weight of the cathode mixture layer, the content of the surfactant is not greater than 0.3 wt %. In some embodiments, based on the total weight of the cathode mixture layer, the content of the surfactant is not greater than 0.2 wt %. In some embodiments, based on the total weight of the cathode mixture layer, the content of the surfactant is not greater than 0.1 wt %.

In some embodiments, the hydrophilic-lipophilic balance (HLB) value of the surfactant is 2 to 10. In some embodiments, the hydrophilic-lipophilic balance (HLB) value of the surfactant is 3 to 8. In some embodiments, the hydrophilic-lipophilic balance (HLB) value of the surfactant is 2, 2.5, 3, 3.5, 4, 4.5, 5, 5.5, 6, 6.5, 7, 7.5, 8, 8.5, 9, 9.5 or 10.

In some embodiments, the surfactant includes at least one of a polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, 4,5-polyoxyethylene sorbitan-4,5-oleate, glycerin monostearate, hydroxylated lanolin, sorbitan monooleate, propylene glycol monolaurate, sorbitan monostearate, diethylene glycol monooleate, diethylene glycol monostearate, diethylene glycol fatty acid ester, polyoxyethylene (2EO) oleyl alcohol, methyl glucoside seequisterate, diethylene glycol monolaurate, sorbitan monopalmitate, polyoxyethylene dioleate, tetraethylene glycol monostearate, tetraethylene glycol monooleate, polyoxypropylene mannitol dioleate, a polyoxyethylene sorbitol lanolin oleate derivative, a polyoxyethylene sorbitol lanolin derivative, polyoxypropylene stearate, polyoxyethylene (5EO) lanolin alcohol, sorbitan laurate, polyoxyethylene fatty acid, polyoxyethylene oxypropylene oleate, tetraethylene glycol monolaurate, polyoxyethylene lauryl ether, polyoxyethylene (4EO) sorbitan monostearate, hexaethylene glycol monostearate, propoxylated (5PO) lanolin alcohol, or polyoxyethylene (5EO) sorbitan monooleate.

In some embodiments, the cathode mixture layer includes N-methylpyrrolidone, based on the total weight of the cathode mixture layer, the content of the N-methylpyrrolidone is not greater than 100 ppm. In some embodiments, based on the total weight of the cathode mixture layer, the content of the N-methylpyrrolidone is not greater than 80 ppm. In some embodiments, based on the total weight of the cathode mixture layer, the content of the N-methylpyrrolidone is not greater than 50 ppm. In some embodiments, based on the total weight of the cathode mixture layer, the content of the N-methylpyrrolidone is not greater than 30 ppm.

The cathode mixture layer further includes a cathode active material layer, the cathode active material layer includes a cathode active material. The cathode active material layer may be one layer or multiple layers, each of the multiple layers of the cathode active material may include identical or different cathode active materials. The cathode active material is any substance capable of reversibly intercalating and deintercalating metal ions such as lithium ions.

The type of the cathode active material is not particularly limited as long as it can occlude and release metal ions (for example, lithium ions) in an electrochemical mode. In some embodiments, the cathode active material is a substance containing lithium and at least one kind of transition metal. Examples of the cathode active material may include, but are not limited to, a lithium transition metal composite oxide and a lithium transition metal containing phosphate compound.

In some embodiments, the transition metal in the lithium transition metal composite oxide includes V, Ti, Cr, Mn, Fe, Co, Ni, Cu and the like. In some embodiments, the lithium transition metal composite oxide includes a lithium cobalt composite oxide such as $LiCoO_2$; a lithium nickel composite oxide such as $LiNiO_2$; a lithium manganese composite oxide such as $LiMnO_2$, $LiMn_2O_4$ and $Li_2MnO_4$; and a lithium nickel manganese cobalt composite oxide such as $LiNi_{1/3}Mn_{1/3}Co_{1/3}O_2$ and $LiNi_{0.5}Mn_{0.3}Co_{0.2}O_2$. A part of the transition metal atoms used as main bodies of the lithium transition metal composite oxides are substituted by other elements such as Na, K, B, F, Al, Ti, V, Cr, Mn, Fe, Co, Li, Ni, Cu, Zn, Mg, Ga, Zr, Si, Nb, Mo, Sn and W. Examples of the lithium transition metal composite oxide may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$ and $LiMn_{1.5}Ni_{0.5}O_4$. Examples of a composition of the lithium transition metal composite oxide include, but are not limited to, a composition of $LiCoO_2$ and $LiMn_2O_4$. Partial Mn in $LiMn_2O_4$ may be substituted by transition metal (for example, $LiNi_{0.33}Co_{0.33}Mn_{0.33}O_2$), and partial Co in $LiCoO_2$ may be substituted by transition metal.

In some embodiments, the transition metal in the lithium transition metal containing phosphate compound includes V, Ti, Cr, Mn, Fe, Co, Ni, Cu and the like. In some embodiments, the lithium transition metal containing phosphate compound includes ferric phosphates such as $LiFePO_4$, $Li_3Fe_2(PO_4)_3$ and $LiFeP_2O_7$, and cobalt phosphates such as $LiCoPO_4$. A part of transition metal atoms used as main bodies of the lithium transition metal containing phosphate compounds are substituted by other elements such as Al, Ti, V, Cr, Mn, Fe, Co, Li, Ni, Cu, Zn, Mg, Ga, Zr, Nb and Si.

In some embodiments, based on the total weight of the cathode active material layer, the content of the cathode active material is greater than 80 wt %, greater than 82 wt % or greater than 84 wt %. In some embodiments, based on the total weight of the cathode active material layer, the content of the cathode active material is smaller than 99 wt % or smaller than 98 wt %. In some embodiments, based on the total weight of the cathode active material layer, the content of the cathode active material is within a range formed by any two of the above numbers. When the content of the cathode active material is within the above range, the electric capacity of the cathode active material in the cathode active material layer can be ensured, and meanwhile, the strength of the cathode can be maintained.

In some embodiments, the cathode active material includes lithium phosphate, which can improve the continuous charge characteristic of the electrochemical device. The use of the lithium phosphate is not limited. In some embodiments, the cathode active material and the lithium phosphate are mixed for use. In some embodiments, based on the total weight of the cathode active material and the lithium phosphate, the content of the lithium phosphate is greater than 0.1 wt %, greater than 0.3 wt % or greater than 0.5 wt %. In some embodiments, based on the total weight of the cathode active material and the lithium phosphate, the content of the lithium phosphate is smaller than 10 wt %, smaller than 8 wt % or smaller than 5 wt %. In some embodiments, the content of the lithium phosphate is within a range formed by any two of the above values.

A substance with different composition from the cathode active material may be attached onto a surface of the cathode active material. Examples of a surface attaching substance may include, but are not limited to, an oxide such as aluminum oxide, silicon dioxide, titanium dioxide, zirconium oxide, magnesium oxide, calcium oxide, boron oxide, antimony oxide and bismuth oxide; a sulfate such as lithium sulfate, sodium sulfate, potassium sulfate, magnesium sulfate, calcium sulfate and aluminum sulfate; a carbonate such as lithium carbonate, calcium carbonate and magnesium carbonate; carbon, etc.

These surface attaching substances may be attached onto the surface of the cathode active material by the following methods: a method of dissolving or suspending the surface attaching substance into a solvent to be seeped or added into the cathode active material and performing drying; a method of dissolving or suspending a precursor of the surface attaching substance into the solvent and enabling the precursor of the surface attaching substance to react by heating and the like after the precursor is seeped and added into the cathode active material; and a method of adding the surface attaching substance into a precursor of the cathode active material and simultaneously firing, etc. Under the carbon attaching condition, a method of performing mechanical attachment of a carbon material (for example, active carbon and the like) may also be used.

In some embodiments, based on the total weight of the cathode active material layer, the content of the surface attaching substance is greater than 0.1 ppm, greater than 1 ppm, or greater than 10 ppm. In some embodiments, based on the total weight of the cathode active material layer, the content of the surface attaching substance is smaller than 20%, smaller than 10%, or smaller than 5%. In some embodiments, based on the total weight of the cathode active material layer, the content of the surface attaching substance is within a range formed by any two of the above values.

By attaching the substance on the surface of the cathode active material, the oxidization reaction of the electrolyte on the surface of the cathode active material can be inhibited, and the service life of the electrochemical device can be prolonged. When the quantity of the surface attaching substance is too small, the effect cannot be sufficiently achieved. When the quantity of the surface attaching substance is too great, access of lithium ions will be impeded, so that the resistance will be increased sometimes.

In the present application, the cathode active material having a substance with different composition from it attached onto the surface thereof is also referred as "cathode active material".

In some embodiments, the shape of the cathode active material includes, but is not limited to, a blocky shape, a polyhedral shape, a spherical shape, an ellipsoidal shape, a plate shape, a needle shape, a cylindrical shape, etc. In some embodiments, particles of the cathode active material include primary particles, secondary particles or a combination thereof. In some embodiments, the primary particles can be agglutinated to form secondary particles.

In some embodiments, the tap density of the cathode active material is greater than 0.5 g/cm$^3$, greater than 0.8 g/cm$^3$, or greater than 1.0 g/cm$^3$. When the tap density of the cathode active material is within the above range, the quantity of a dispersing medium and the quantity of a conductive material and a cathode adhesive required during formation of the cathode active material layer can be inhibited, so that the filling rate of the cathode active material and the capacity of the electrochemical device can be ensured. By using composite oxide powder with high tap density, a high-density cathode active material layer can be formed. The tap density is more preferable when being higher, and does not have a particular upper limit. In some embodiments, the tap density of the cathode active material is smaller than 4.0 g/cm$^3$, smaller than 3.7 g/cm$^3$, or smaller than 3.5 g/cm$^3$. If the tap density of the cathode active material has the above upper limit, the reduction of the load characteristic can be inhibited.

The tap density of the cathode active material may be calculated in a following mode: putting 5 to 10 g of cathode active material powder into a 10 mL glass graduated cylinder, and performing vibration with a stroke of about 20 mm 200 times to obtain the powder filling density (tap density).

When the particles of the cathode active material are primary particles, the median particle diameter (D50) of the particles of the cathode active material refers to the primary particle diameter of the particles of the cathode active material. When the primary particles of the particles of the cathode active material are agglutinated to form secondary particles, the median particle diameter (D50) of the particles of the cathode active material refers to the secondary particle diameter of the particles of the cathode active material.

In some embodiments, the median particle diameter (D50) of the particles of the cathode active material is greater than 0.3 μm, greater than 0.5 μm, greater than 0.8 μm or greater than 1.0 μm. In some embodiments, the median particle diameter (D50) of the particles of the cathode active material is smaller than 30 μm, smaller than 27 μm, smaller than 25 μm, or smaller than 22 μm. In some embodiments, the median particle diameter (D50) of the particles of the cathode active material is within a range formed by any two of the above values. When the median particle diameter (D50) of the particles of the cathode active material is within the above range, the cathode active material with high tap density can be obtained, and the reduction of the performance of the electrochemical device can be inhibited. On the other hand, in a preparation process of a cathode of the electrochemical device (i.e., the cathode active material, the conductive material, the adhesive and the like are made into slurry through a solvent and coated in a film), problems of strip generation and the like can be avoided. Here, more than two cathode active materials with different median particle diameters are mixed, and the filling performance during preparation of the cathode can be further improved.

The median particle diameter (D50) of the particles of the cathode active material can be determined by a laser diffraction/scattering particle size distribution determining device: with LA-920 manufactured by HORIBA as a particle size distribution meter, using a 0.1 wt % sodium hexametaphosphate water solution as a dispersing medium used during determination, and setting a determination refractive index into 1.24 after 5 min of ultrasonic dispersion for determination.

Under the condition that the primary particles of the particles of the cathode active material are agglutinated to form secondary particles, in some embodiments, the average primary particle diameter of the cathode active material is greater than 0.05 μm, greater than 0.1 μm, or greater than 0.5 μm. In some embodiments, the average primary particle diameter of the cathode active material is smaller than 5 μm, smaller than 4 μm, smaller than 3 μm, or smaller than 2 μm. In some embodiments, the average primary particle diameter of the cathode active material is within a range formed by any two of the above values. When the average primary particle diameter of the cathode active material is within the above range, the powder filing performance and the specific surface area can be ensured, the reduction of the battery performance can be inhibited, and proper crystallinity can be obtained, so that the charge and discharge reversibility of the electrochemical device can be ensured.

The average primary particle diameter of the cathode active material may be obtained through observation on an image obtained by a scanning electron microscope (SEM): in an 10000-time SEM image, for any 50 primary particles, solving a longest value of a slice obtained by left and right border lines of the primary particles relative to a straight line in a horizontal direction, solving the average value, and thus obtaining the average primary particle diameter.

In some embodiments, the specific surface area (BET) of the cathode active material is greater than 0.1 m$^2$/g, greater than 0.2 m$^2$/g, or greater than 0.3 m$^2$/g. In some embodiments, the specific surface area (BET) of the cathode active material is smaller than 50 m$^2$/g, smaller than 40 m$^2$/g or smaller than 30 m$^2$/g. In some embodiments, the specific surface area (BET) of the cathode active material is within a range formed by any two of the above values. When the specific surface area (BET) of the cathode active material is within the above range, the performance of the electrochemical device can be ensured, and meanwhile, the cathode active material can have good coating performance.

The specific surface area (BET) of the cathode active material may be measured by the following method: using a surface area meter (for example, a fully automatic surface area determining device manufactured by Ohkura Riken), pre-drying a sample for 30 min at 150° C. under the nitrogen gas circulation condition, then, using nitrogen and helium mixed gas with the nitrogen gas precisely regulated to 0.3 relative to the relative pressure value of the atmospheric pressure, and performing determination by a nitrogen adsorption BET single-point method of a gas flowing method.

The type of a cathode conductive material is not limited, and any known conductive material may be used. Examples of the cathode conductive material may include, but are not limited to, graphite such as natural graphite and artificial graphite; carbon block such as acetylene black; a carbon material such as amorphous carbon including needle coke and the like; carbon nanotubes; graphene; etc. The above cathode conductive materials may be used singly or in any combination.

In some embodiments, based on the total weight of the cathode active material layer, the content of the cathode conductive material is greater than 0.01 wt %, greater than 0.1 wt % or greater than 1 wt %. In some embodiments, based on the total weight of the cathode active material layer, the content of the cathode conductive material is smaller than 50 wt %, smaller than 30 wt % or smaller than 15 wt %. When the content of the cathode conductive material is within the above range, the full conductivity and the capacity of the electrochemical device can be ensured.

The type of a cathode adhesive used in manufacturing of the cathode active material layer is not particularly limited. In case of a coating method, the cathode adhesive may be any material which can be dissolved or dispersed in a liquid medium used during manufacturing of an electrode. Examples of the cathode adhesive may include, but are not limited to, one or more of the following: resin polymers such as polyethylene, polypropylene, polyethylene glycol terephthalate, polymethyl methacrylate, polyimide, aromatic polyamide, cellulose and nitrocellulose; rubber polymers such as styrene butadiene rubber (SBR), nitrile butadiene rubber (NBR), fluororubber, isoprene rubber, butadiene rubber and ethylene-propylene rubber; thermoplastic elastomer polymers such as a styrene-butadiene-styrene block copolymer or a hydride thereof, an ethylene-propylene-diene terpolymer (EPDM), a styrene-ethylene-butadiene-ethylene copolymer, and a styrene-isoprene-styrene block copolymer or a hydride thereof; soft resin polymers such as syndiotactic-1, 2-polybutadiene, polyvinyl acetate, an ethylene-vinyl acetate copolymer, and a propylene-α-olefin copolymer; fluoride polymers such as polyvinylidene fluoride (PVDF), polytetrafluoroethylene, fluorinated polyvinylidene fluoride and polytetrafluoroethylene-ethylene copolymers; ionic conductivity polymer compositions with alkali metal ions (particularly lithium ions), etc. The above cathode adhesives may be used singly or in any combination.

In some embodiments, based on the total weight of the cathode active material layer, the content of the cathode adhesive is greater than 0.1 wt %, greater than 1 wt % or greater than 1.5 wt %. In some embodiments, based on the total weight of the cathode active material layer, the content of the cathode adhesive is smaller than 80 wt %, smaller than 60 wt %, smaller than 40 wt %, or smaller than 10 wt %. When the content of the cathode adhesive is within the above range, the cathode can have good conductivity and sufficient mechanical strength, and the capacity of the electrochemical device is ensured.

The type of solvent for forming cathode slurry is not limited as long as it is a solvent capable of dissolving or dispersing the cathode active material, the conductive material, the cathode adhesive and a thickening agent used according to requirements. Examples of the solvent for forming the cathode slurry may include any one of an aqueous solvent and an organic solvent. Examples of the aqueous media may include, but are not limited to, water, a mixed medium of alcohol and water, etc. Examples of the organic media may include, but are not limited to, aliphatic hydrocarbons such as hexane; aromatic hydrocarbons such as benzene, methylbenzene, xylene and methylnaphthalene; heterocyclic compounds such as quinoline and pyridine; ketones such as acetone, methyl ethyl ketone and cyclohexanone; esters such as methyl acetate and methyl acrylate; amines such as diethylenetriamine and N,N-dimethyl aminopropyl amine; ethers such as diethyl ether, epoxy propane and tetrahydrofuran (THF); amides such as N-methylpyrrolidone (NMP), dimethylformamide and dimethylacetamide; and aprotic polar solvents such as hexamethylphosphoramide and dimethyl sulfoxide, etc.

The thickening agent is generally used to regulate the viscosity of slurry. In the case of an aqueous solvent, the thickening agent and a styrene butadiene rubber (SBR) emulsion may be used for slurry preparation. The type of the thickening agent is not particularly limited. Examples of the thickening agent may include, but are not limited to, carboxymethyl cellulose, methylcellulose, hydroxymethyl cellulose, ethyl cellulose, polyvinyl alcohol, oxidized starch, phosphated starch, casein and salts thereof, etc. The above thickening agents may be used singly or in any combination.

In some embodiments, based on the total weight of the cathode active material layer, the content of the thickening agent is greater than 0.1 wt %, greater than 0.2 wt %, or greater than 0.3 wt %. In some embodiments, based on the total weight of the cathode active material layer, the content of the thickening agent is smaller than 5 wt %, smaller than 3 wt %, or smaller than 2 wt %. In some embodiments, based on the total weight of the cathode active material layer, the content of the thickening agent is within a range formed by any two of the above values. When the content of the thickening agent is within the above range, the cathode slurry can have good coating performance, and meanwhile, the reduction of the capacity and the increase of the resistance of the electrochemical device can be inhibited.

For the cathode active material layer obtained through coating and drying, in order to improve the filling density of the cathode active material, compression treatment may be performed through a manual press or a roller press and the like. In some embodiments, the density of the cathode active material layer is greater than 1.5 g/cm$^3$, greater than 2 g/cm$^3$, or greater than 2.2 g/cm$^3$. In some embodiments, the density of the cathode active material layer is smaller than 5 g/cm$^3$, smaller than 4.5 g/cm$^3$ or smaller than 4 g/cm$^3$. In some embodiments, the density of the cathode active material layer is within a range formed by any two of the above values. When the density of the cathode active material layer is within the above range, the electrochemical device can have good charge and discharge characteristics, and meanwhile, the increase of the resistance can be inhibited.

The thickness of the cathode active material layer refers to the thickness of the cathode active material layer on any one side of the cathode current collector. In some embodiments, the thickness of the cathode active material layer is greater than 10 µm or greater than 20 µm. In some embodiments, the thickness of the cathode active material layer is smaller than 500 µm or smaller than 450 µm.

The cathode active material may be manufactured by a common method for manufacturing an inorganic compound. In order to manufacture a spherical or ellipsoidal cathode active material, the following manufacturing method may be used: dissolving or crushing and dispersing a transition metal raw material substance into a solvent such as water, regulating pH while stirring, manufacturing and recovering spherical precursors, drying the spherical precursors according to requirements, then adding a Li source such as LiOH, $Li_2CO_3$ and $LiNO_3$, and performing firing at a high temperature to obtain the cathode active material.

The cathode may be manufactured by forming the cathode mixture layer containing the cathode active material and an adhesive active material onto the cathode current collector. The cathode using the cathode active material may be manufactured by a conventional method: performing dry mixing on the cathode active material, the adhesive active material, the conductive material and the thickening agent (according to requirements), and the like to obtain flakes, and pressing and connecting the obtained flakes onto the cathode current collector; or dissolving or dispersing the materials into a liquid medium to prepare slurry, coating the slurry onto the cathode current collector, performing drying to form the cathode mixture layer on the cathode current collector, and thus obtaining the cathode.

II. Electrolyte

The electrolyte used in the electrochemical device of the present application includes an electrolyte and a solvent for dissolving the electrolyte. In some embodiments, the electrolyte used in the electrochemical device of the present application further includes an additive.

In some embodiments, the electrolyte used in the electrochemical device of the present application includes at least one of the following compounds:
(a) a compound with a cyano group(s);
(b) lithium difluorophosphate; or
(c) a compound of Formula 1:

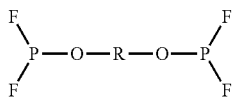

Formula 1 wherein R is a substituted or unsubstituted $C_1$-$C_{10}$ alkyl, and when substituted, a substituent group is halogen.
(a) Compound with a Cyano Group(s);

The compound with a cyano group(s) is not particularly limited as long as it is an organic compound with at least one cyano group in the molecule.

In some embodiments, the compound with a cyano group(s) includes at least one of structures of Formula 2, Formula 3, Formula 4 or Formula 5:

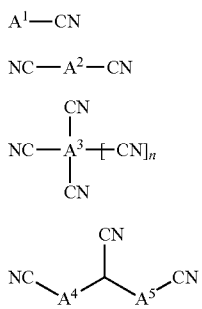

Formula 2

Formula 3

Formula 4

Formula 5

Compound of Formula 2

In some embodiments, the compound with a cyano group(s) has Formula 2:

$A^1$-CN      Formula 2

The molecular weight of the compound of Formula 2 is not particularly limited. In some embodiments, the molecular weight of the compound of Formula 2 is greater than 55, greater than 65 or greater than 80. In some embodiments, the molecular weight of the compound of Formula 2 is smaller than 310, smaller than 185 or smaller than 155. The compound of Formula 2 with the above molecular weight has proper dissolubility in the electrolyte.

In some embodiments, $A^1$ in Formula 2 is selected from a group consisting of the following: $C_{2-20}$ alkyl, $C_{2-20}$ halogenated alkyl, $C_{2-20}$ alkenyl, $C_{2-20}$ halogenated alkenyl, $C_{2-20}$ alkynyl, $C_{2-20}$ halogenated alkynyl, $C_{6-30}$ aryl and $C_{6-30}$ halogenated aryl. In some embodiments, $A^1$ is selected from $C_{2-15}$ straight or branched alkyl or $C_{2-4}$ alkenyl. In some embodiments, $A^1$ is $C_{2-12}$ straight or branched alkyl. In some embodiments, $A^1$ is $C_{4-11}$ straight or branched alkyl. In some embodiments, $A^1$ is selected from alkyl such as ethyl, n-propyl, isopropyl, isopropyl, n-butyl, sec-butyl, isobutyl, tert-butyl, n-amyl, tert-pentyl, hexyl, heptyl, octyl, nonyl, decyl, hendecyl, dodecyl, tridecyl, tetradecyl, pentadecyl, hexadecyl, heptadecyl, octadecyl, nonadecyl and eicosyl; alkenyl such as ethenyl, 1-propenyl, isopropenyl, 1-butenyl and 1-pentenyl; alkynyl such as ethynyl, 1-propinyl, 1-butynyl and 1-pentynyl; and aryl such as phenyl, tolyl, ethyl phenyl, n-propyl phenyl, isopropyl phenyl, n-butyl phenyl, sec-butyl phenyl, isobutyl phenyl, tert-butyl phenyl, trifluoromethyl phenyl, xylyl, benzyl, phenethyl, methoxyphenyl, ethoxyphenyl or trifluoromethoxy phenyl, etc.

Examples of the compound of Formula 2 may include, but are not limited to, propionitrile, butyronitrile, valeronitrile, hexanenitrile, heptonitrile, octanenitrile, nonanenitrile, caprinitrile, undecanonitrile, dodecanenitrile, cyclopentanecarbonitrile, cyclohexanecarbonitrile, acrylonitrile, methacrylonitrile, butenenitrile, 3-methyl butenenitrile, 2-methyl-2-butenenitrile, 2-pentenenitrile, 2-methyl-2-pentenenitrile, 3-methyl-2-pentenenitrile and 2-hexenenitrile, etc. In some embodiments, the compound of Formula 2 is selected from valeronitrile, octanenitrile, caprinitrile, dodecanenitrile and butenenitrile. In some embodiments, the compound of Formula 2 is selected from valeronitrile, caprinitrile or butenenitrile.

Compound of Formula 3

In some embodiments, the compound with a cyano group(s) has Formula 3:

NC-$A^2$-CN      Formula 3

The molecular weight of the compound of Formula 3 is not particularly limited. The smaller the molecular weight of the compound of Formula 3, the greater the proportion of the cyano in the molecules, and the greater the viscosity of the molecules. The greater the molecular weight, the higher the boiling point of the compound. In some embodiments, the molecular weight of the compound of Formula 3 is greater than 65, greater than 80, or greater than 90. In some embodiments, the molecular weight of the compound of Formula 3 is smaller than 270, smaller than 160, or smaller than 135. The compound presented by Formula 3 with the above molecular weight has proper viscosity, boiling point and dissolubility in the electrolyte.

In some embodiments, $A^2$ in Formula 3 is an organic group with 1 to 30 carbon atoms. The original group is comprised of at least one of the following atoms: hydrogen atoms, carbon atoms, nitrogen atoms, oxygen atoms, sulfur atoms, phosphorus atoms and halogen atoms. In some embodiments, the organic group includes carbon atoms, hydrogen atoms, and at least one of the following heteroatoms: nitrogen atoms, oxygen atoms, sulfur atoms, phosphorus atoms or halogen atoms. The carbon atoms and the hydrogen atoms form a framework structure of the organic group. A part of the carbon atoms in the framework structure are substituted by the heteroatoms, and/or the organic group includes a substituent group formed by the carbon atoms, the hydrogen atoms and/or the heteroatoms.

In some embodiments, $A^2$ is selected from $C_{2-20}$ alkylene, $C_{2-20}$ halogenated alkylene, $C_{2-20}$ alkenylene, $C_{2-20}$ halogenated alkenylene, $C_{2-20}$ alkynylene, $C_{2-20}$ halogenated alkynylene, $C_{6-30}$ arylidene, $C_{6-30}$ halogenated arylidene, carbonyl, sulfonyl, sulfinyl, ether group, thioether group, dialkyl borate group or boron alkyl. In some embodiments, $A^2$ is selected from $C_{2-20}$ alkylene, $C_{2-20}$ halogenated alkylene, $C_{2-20}$ alkenylene, $C_{2-20}$ halogenated alkenylene, $C_{2-20}$ alkynylene, $C_{2-20}$ halogenated alkynylene, $C_{6-30}$ arylidene or $C_{6-30}$ halogenated arylidene. In some embodiments, $A^2$ is $C_{2-5}$ alkylene, or $C_{2-5}$ halogenated alkylene.

Examples of the compound of Formula 3 may include, but are not limited to, malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexane dicarbonitrile, 2,3-diisobutyl-2,3-dimethylsuccinonitrile, 2,2-diisobutyl-3,3-dimethylsuccinonitrile, 2-methyl pentanedinitrile, 2,3-dimethyl pentanedinitrile, 2,4-dimethyl pentanedinitrile, 2,2,3,3-tetramethyl pentanedinitrile, 2,2,4,4-tetramethyl pentanedinitrile, 2,2,3,4-tetramethyl pentanedinitrile, 2,3,3,4-tetramethyl pentanedinitrile, malonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile and 3,9-bis(2-cyanoethyl)-2,4,8,10-tetraoxaspiro [5,5] undecane, etc.

In some embodiments, the compound of Formula 3 is selected from malononitrile, succinonitrile, glutaronitrile, adiponitrile, pimelonitrile, suberonitrile, azelanitrile, sebaconitrile, undecanedinitrile, dodecanedinitrile and 3,9-bis(2-cyanoethyl)-2,4,8,10-tetraoxaspiro [5,5] undecane or fumaronitrile. In some embodiments, the compound of Formula 3 is selected from succinonitrile, glutaronitrile, adiponitrile, pimelonitrile, suberonitrile, glutaronitrile or 3,9-bis(2-cyanoethyl)-2,4,8,10-tetraoxaspiro [5,5] undecane.

In some embodiments, the compound of Formula 3 is selected from succinonitrile, glutaronitrile, adiponitrile or pimelonitrile.

Compound of Formula 4

In some embodiments, the compound with a cyano group(s) has Formula 4:

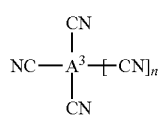

Formula 4

In some embodiments, $A^3$ in Formula 4 is an organic group with 1 to 30 carbon atoms. The organic group is formed by at least one of the following atoms: hydrogen atoms, carbon atoms, nitrogen atoms, oxygen atoms, sulfur atoms, phosphorus atoms and halogen atoms. In some embodiments, the organic group includes carbon atoms, hydrogen atoms, and at least one of the following heteroatoms: nitrogen atoms, oxygen atoms, sulfur atoms, phosphorus atoms or halogen atoms. The carbon atoms and the hydrogen atoms form a framework structure of the organic group. A part of the carbon atoms in the framework structure are substituted by the heteroatoms, and/or the organic group includes a substituent group formed by the carbon atoms, the hydrogen atoms and/or the heteroatoms.

In some embodiments, $A^3$ is selected from $C_{2-20}$ alkylene, $C_{2-20}$ halogenated alkylene, $C_{2-20}$ alkynylene, $C_{2-20}$ halogenated alkynylene, $C_{2-20}$ alkynylene, $C_{2-20}$ halogenated alkynylene, $C_{6-30}$ arylidene, $C_{6-30}$ halogenated arylidene, and $C_{2-20}$ alkoxy.

In some embodiments, $A^3$ is selected from $C_{2-12}$ alkylene, $C_{2-12}$ halogenated alkylene, $C_{2-12}$ alkynylene, $C_{2-12}$ halogenated alkynylene, $C_{2-12}$ alkynylene, $C_{2-12}$ halogenated alkynylene or $C_{2-12}$ alkoxy.

In some embodiments, n is an integer of 0 to 5. In some embodiments, n is 0, 1, 2, 3, 4 or 5.

Examples of the compound of Formula 4 may include, but are not limited to, the following compounds:

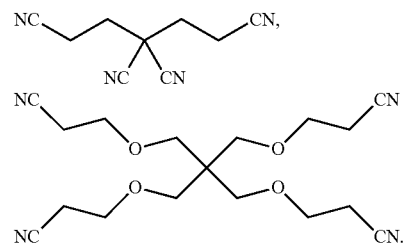

Compound of Formula 5

In some embodiments, the compound with a cyano group(s) has Formula 5:

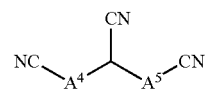

Formula 5

The molecular weight of the compound of Formula 5 is not particularly limited. In some embodiments, the molecular weight of the compound of Formula 5 is greater than 90, greater than 120 or greater than 150. In some embodiments, the molecular weight of the compound of Formula 5 is smaller than 450, smaller than 300, or smaller than 250. The compound of Formula 5 with the above molecular weight has proper dissolubility in the electrolyte.

In some embodiments, $A^4$ and $A^5$ in Formula 5 are respectively and independently selected from a group consisting of the following: $C_{2-20}$ alkylene, $C_{2-20}$ halogenated alkylene, $C_{2-20}$ alkynylene, $C_{2-20}$ halogenated alkynylene, $C_{2-20}$ alkynylene, $C_{2-20}$ halogenated alkynylene, $C_{6-30}$ arylidene and $C_{6-30}$ halogenated arylidene. In some embodiments, $A^4$ and $A^5$ are respectively and independently selected from $C_{2-5}$ alkylene, $C_{2-5}$ halogenated alkylene, $C_{2-5}$ alkynylene, $C_{2-5}$ halogenated alkynylene, $C_{2-5}$ alkynylene or $C_{2-5}$ halogenated alkynylene. In some embodiments, $A^4$ and $A^5$ are respectively and independently selected from methylene, ethylidene, 1,3-propylidene, tetraethylene, pentamethylene, 1,2-alkynylene, 1-propenylidene, 2-propenylidene, 1-butenylidene, 2-butenylidene, 1-pentenylene, 2-pentenylene, ethynylene, propynylene, 1-butynelene, 2-butynelene, 1-pentynylene or 2-pentynylene.

In some embodiments, $A^4$ and $A^5$ are respectively and independently selected from methylene, ethylidene, 1,3-propylidene, tetraethylene, pentamethylene, and are preferably methylene, ethylidene or 1,3-propylidene.

Examples of the compound of Formula 5 include, but are not limited to, the following compounds:

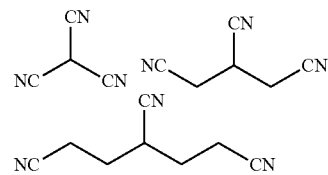

-continued

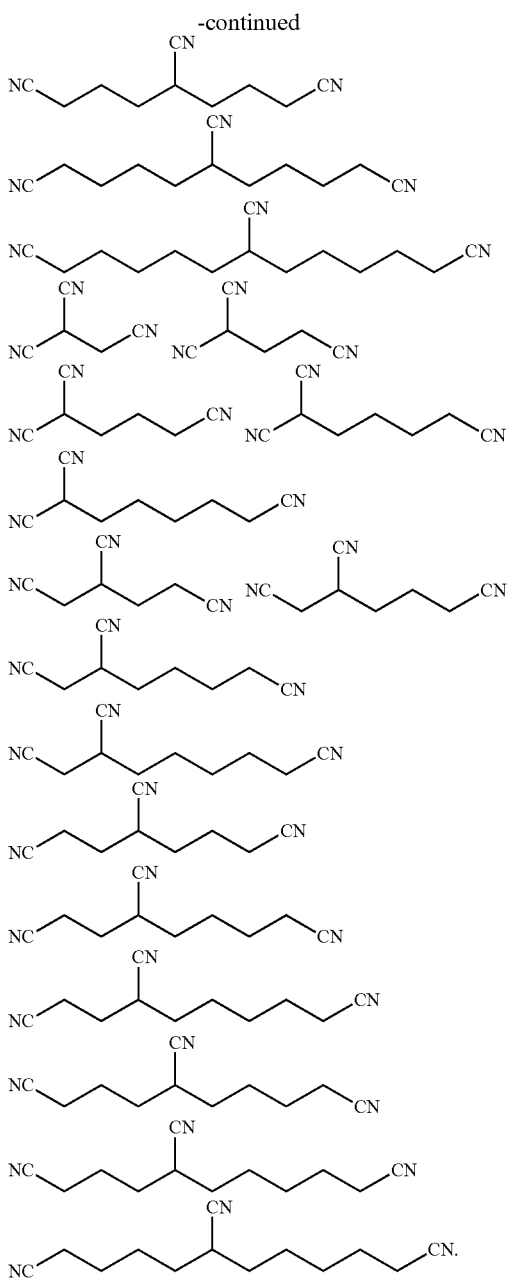

In some embodiments, the compound with a cyano group(s) includes, but is not limited to, one or more of the following: butanedinitrile, glutaronitrile, adiponitrile, 1,5-dicyanopentane, 1,6-dicyanohexane, tetramethylsuccinonitrile, 2-methyl pentanedinitrile, 2,4-dimethyl pentanedinitrile, 2,2,4,4-tetramethyl pentanedinitrile, 1,4-dicyanopentane, 1,2-dicyanobenzene, 1,3-dicyanobenzene, 1,4-dicyanobenzene, ethylene glycol bis(propionitrile)ether, 3,5-dioxa-heptanedinitrile, 1,4-bis(cyanoethoxy)butane, diethylene glycol bis(2-cyanoethyl)ether, triethylene glycol bis(2-cyanoethyl)ether, tetraethylene glycol bis(2-cyanoethyl)ether, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxy methylene) ethane, 1,1,1-tris(cyanoethoxy methylene)propane, 3-methyl-1,3,5-tris(cyanoethoxy)pentane, 1,2,7-tris(cyanoethoxy)heptane, 1,2,6-tris(cyanoethoxy)hexane, and 1,2,5-tris(cyanoethoxy)pentane.

The compounds with a cyano group(s) may be used singly or in any combination. When the electrolyte contains two or more compounds with a cyano group(s), the content of the compounds with a cyano group(s) refers to the total content of the two or more compounds with a cyano group(s). In some embodiments, based on the total weight of the electrolyte, the content of the compound with a cyano group(s) is greater than 0.001 wt %. In some embodiments, based on the total weight of the electrolyte, the content of the compound with a cyano group(s) is greater than 0.01 wt %. In some embodiments, based on the total weight of the electrolyte, the content of the compound with a cyano group(s) is greater than 0.1 wt %. In some embodiments, based on the total weight of the electrolyte, the content of the compound with a cyano group(s) is smaller than 10 wt %. In some embodiments, based on the total weight of the electrolyte, the content of the compound with a cyano group(s) is smaller than 8 wt %. In some embodiments, based on the total weight of the electrolyte, the content of the compound with a cyano group(s) is smaller than 5 wt %. In some embodiments, based on the total weight of the electrolyte, the content of the compound with a cyano group(s) is smaller than 2 wt %. In some embodiments, based on the total weight of the electrolyte, the content of the compound with a cyano group(s) is smaller than 1 wt %. In some embodiments, based on the total weight of the electrolyte, the content of the compound with a cyano group(s) is smaller than 0.5 wt %. In some embodiments, based on the total weight of the electrolyte, the content of the compound with a cyano group(s) is within a range formed by any two of the above values. When the content of the compound with a cyano group(s) is in the above range, the improvement of the characteristics including the output power characteristic, the load characteristic, the low-temperature characteristic, the cycle characteristic, the high-temperature storage characteristic and the like of the electrochemical device is facilitated.

(b) Lithium Difluorophosphate ($LiPO_2F_2$)

In some embodiments, based on the total weight of the electrolyte, the content of the lithium difluorophosphate is 0.01 wt % to 1 wt %. In some embodiments, based on the total weight of the electrolyte, the content of the lithium difluorophosphate is 0.05 wt % to 0.8 wt %. In some embodiments, based on the total weight of the electrolyte, the content of the lithium difluorophosphate is 0.1 wt % to 0.5 wt %. In some embodiments, based on the total weight of the electrolyte, the content of the lithium difluorophosphate is 0.1 wt % to 0.4 wt %. In some embodiments, based on the total weight of the electrolyte, the content of the lithium difluorophosphate is 0.2 wt % to 0.35 wt %. In some embodiments, based on the total weight of the electrolyte, the content of the lithium difluorophosphate is 0.25 wt % to 0.3 wt %.

(c) Compound of Formula 1

Examples of the compound of Formula 1 may include, but are not limited to:

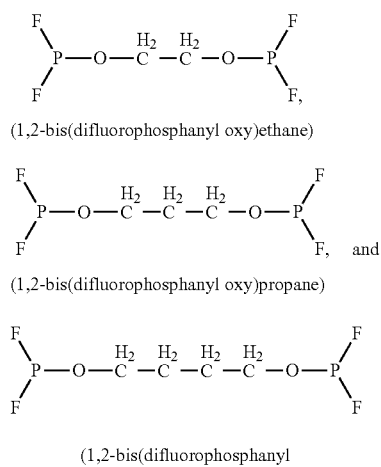

Formula 1-1 (1,2-bis(difluorophosphanyl oxy)ethane)

Formula 1-2 (1,2-bis(difluorophosphanyl oxy)propane)

Formula 1-3 (1,2-bis(difluorophosphanyl oxy)butane).

In some embodiments, based on the total weight of the electrolyte, the content of the compound of Formula 1 is 0.01 wt % to 15 wt %. In some embodiments, based on the total weight of the electrolyte, the content of the compound of Formula 1 is 0.05 wt % to 12 wt %. In some embodiments, based on the total weight of the electrolyte, the content of the compound of Formula 1 is 0.1 wt % to 10 wt %. In some embodiments, based on the total weight of the electrolyte, the content of the compound of Formula 1 is 0.5 wt % to 8 wt %. In some embodiments, based on the total weight of the electrolyte, the content of the compound of Formula 1 is 1 wt % to 5 wt %. In some embodiments, based on the total weight of the electrolyte, the content of the compound of Formula 1 is 2 wt % to 4 wt %.

Solvent

In some embodiments, the electrolyte further includes any known non-aqueous solvent capable of being used as the solvent of the electrolyte in the prior art.

In some embodiments, the non-aqueous solvent includes, but is not limited to, one or more of the following: cyclic carbonate, chain carbonate, carboxylic ester, cyclic ether, chain ether, phosphorus-containing organic solvents, sulfur-containing organic solvents, and aromatic fluorine-containing solvents.

In some embodiments, examples of the cyclic carbonate may include, but are not limited to, one or more of the following: ethylene carbonate (EC), polypropylene carbonate (PC) and butylene carbonate. In some embodiments, the cyclic carbonate has 3 to 6 carbon atoms.

In some embodiments, examples of the chain carbonate may include, but are not limited to, one or more of the following: chain carbonate such as dimethyl carbonate, ethyl methyl carbonate, diethyl carbonate (DEC), methyl n-propyl carbonate, ethyl n-propyl carbonate, and di-n-propyl carbonate. In some embodiments, examples of the fluorine-substituted chain carbonate may include, but are not limited to, one or more of the following: bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, 2,2,2-trifluoroethyl methyl carbonate, etc.

In some embodiments, the non-aqueous solvent includes a carboxylic ester. In some embodiments, the content X mg of the carboxylic ester in the electrolyte and the reaction area Y m$^2$ of the cathode mixture layer meet the following relationship: $10 \leq (X/Y) \leq 100$. In some embodiments, X and Y meet the following relationship: $10 \leq (X/Y) < 100$. In some embodiments, X and Y meet the following relationship: $20 \leq (X/Y) < 70$.

The reaction area of the cathode mixture layer may be determined by the following method: using a surface area meter (a fully automatic surface area determining device manufactured by Ohkura Riken), pre-drying a sample for 15 min at 350° C. under the nitrogen gas circulation condition, then using nitrogen helium mixed gas with the nitrogen gas precisely regulated to 0.3 relative to the relative pressure value of the atmospheric pressure, and performing determination by a nitrogen adsorption BET single-point method of a gas flowing method. The specific surface area (m$^2$/g) of the cathode mixture layer is tested by the method. The specific surface area of the cathode mixture layer refers to a specific surface area of a whole of the cathode mixture layer including the cathode active material and the additives (the adhesive, the conductive agent, the thickening agent, a filling material, etc.). The weight of the cathode mixture layer, i.e., the total weight of the whole of the cathode mixture layer including the cathode active material and the additives (the adhesive, the conductive agent, the thickening agent, the filling material, etc.) is measured. The reaction area of the cathode mixture layer is calculated through the following formula:

Reaction area=specific surface area of cathode mixture layer×weight of cathode mixture layer.

In some embodiments, the carboxylic ester includes at least one of a chain carboxylic ester or a cyclic carboxylic ester.

In some embodiments, examples of the cyclic carboxylic ester may include, but are not limited to, one or more of the following: γ-butyrolactone and γ-valerolactone. In some embodiments, partial hydrogen atoms of the cyclic carboxylic ester may be substituted by fluorine.

In some embodiments, examples of the chain carboxylic ester may include, but are not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, ethyl pivalate, etc. In some embodiments, partial hydrogen atoms of the chain carboxylic ester may be substituted by fluorine. In some embodiments, examples of the fluorine-substituted chain carboxylic ester may include, but are not limited to, methyl trifluoroacetate, ethyl trifluoroacetate, allyl trifluoroacetate, butyl trifluoroacetate, 2,2,2-trifluoroethyl trifluoroacetate, etc.

In some embodiments, examples of the cyclic ether may include, but are not limited to, one or more of the following: tetrahydrofuran, 2-methyltetrahydrofuran, 1,3-dioxolane, 2-methyl-1,3-dioxolane, 4-methyl 1,3-dioxolane, 1,3-dioxane, 1,4-dioxane and dimethoxypropane.

In some embodiments, examples of the chain ether may include, but are not limited to, one or more of the following: dimethoxymethane, 1,1-dimethoxyethane, 1,2-dimethoxyethane, diethoxymethane, 1,1-diethoxyethane, 1,2-diethoxyethane, ethoxy methoxymethane, 1,1-ethoxy methoxyethane, 1,2-ethoxy methoxyethane, etc.

In some embodiments, examples of the phosphorus-containing organic solvent may include, but are not limited to, one or more of the following: trimethyl phosphate, triethyl phosphate, ethyl dimethyl phosphate, diethyl methyl phosphonate, methyl ethidene phosphate, ethyl ethidene phosphate, triphenyl phosphate, trimethyl phosphite, triethyl phosphite, triphenyl phosphite, tris(2,2,2-trifluoroethyl) phosphate, tris(2,2,3,3,3-pentafluoropropyl) phosphate, etc.

In some embodiments, examples of the sulfur-containing organic solvent may include, but are not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanedisulfonate, ethyl ethanedisulfonate, dimethyl sulfate, diethyl sulfate and butyl sulfate. In some embodiments, partial hydrogen atoms of the sulfur-containing organic solvent may be substituted by fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene and trifluoromethyl benzene.

In some embodiments, the solvent used in the electrolyte of the present application includes cyclic carbonate, chain carbonate, cyclic carboxylate, chain carboxylate and a combination thereof. In some embodiments, the solvent used in the electrolyte of the present application includes at least one of ethylene carbonate, propylene carbonate, diethyl carbonate, ethyl propionate, propyl propionate, n-propyl acetate or ethyl acetate. In some embodiments, the solvent used in the electrolyte of the present application includes ethylene carbonate, propylene carbonate, diethyl carbonate, ethyl propionate, propyl propionate, γ-butyrolactone and a combination thereof.

After the chain carboxylate and/or cyclic carboxylate are/is added into the electrolyte, the chain carboxylate and/or cyclic carboxylate may form a passivation film on the surface of the electrode, thus improving the capacity retention rate of the electrochemical device after an intermittent charge cycle. In some embodiments, the electrolyte contains 1 wt % to 60 wt % chain carboxylate, cyclic carboxylate and a combination thereof. In some embodiments, the electrolyte contains ethyl propionate, propyl propionate and γ-butyrolactone and a combination thereof. Based on the total weight of the electrolyte, the content of the combination is 1 wt % to 60 wt %, 10 wt % to 60 wt %, 10 wt % to 50 wt %, and 20 wt % to 50 wt %. In some embodiments, based on the total weight of the electrolyte, the electrolyte contains 1 wt % to 60 wt %, 10 wt % to 60 wt %, 20 wt % to 50 wt %, 20 wt % to 40 wt % or 30 wt % of propyl propionate.

Additive

In some embodiments, examples of the additive may include, but are not limited to, one or more of the following: fluorocarbonate, ethylene carbonate with carbon-carbon double bonds, compounds with sulfur-oxygen double bonds and anhydride.

In some embodiments, based on the total weight of the electrolyte, the content of the additive is 0.01% to 15%, 0.1% to 10%, or 1% to 5%.

According to embodiments of the present application, based on the total weight of the electrolyte, the content of propionic ester is 1.5 to 30 times, 1.5 to 20 times, 2 to 20 times, or 5 to 20 times that of the additive.

In some embodiments, the additive includes one or more kinds of fluorocarbonates. During charging/discharging of the lithium-ion battery, the fluorocarbonate and the propionic ester jointly act to form a stable protection film on the surface of the anode, thus inhibiting the decomposition reaction of the electrolyte.

In some embodiments, the fluorocarbonate has a formula $C=O(OR_1)(OR_2)$, wherein $R_1$ and $R_2$ are respectively selected from alkyl or halogenated alkyl with 1 to 6 carbon atoms, at least one of $R_1$ and $R_2$ is selected from fluoroalkyl with 1 to 6 carbon atoms, and $R_1$ and $R_2$ optionally form 5-membered to 7-membered rings together with their connected atoms.

In some embodiments, examples of the fluorocarbonate may include, but are not limited to, one or more of the following: fluoroethylene carbonate, cis 4,4-ethylene difluorocarbonate, trans 4,4-ethylene difluorocarbonate, 4,5-ethylene difluorocarbonate, 4-fluoro-4-methylethylene carbonate, 4-fluoro-5-methylethylene carbonate, methyl trifluoromethyl carbonate, methyl trifluoroethyl carbonate, trifluoroethyl ethyl carbonate, etc.

In some embodiments, the additive includes one or more kinds of ethylene carbonate containing carbon-carbon double bonds. Examples of the ethylene carbonate containing carbon-carbon double bonds may include, but are not limited to, one or more of the following: vinylene carbonate, methyl vinylene carbonate, ethyl vinylene carbonate, 1,2-dimethylvinylene carbonate, 1,2-diethylvinylene carbonate, fluorovinylene carbonate, trifluoromethyl vinylene carbonate, vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate, 1,1-diethyl-2-methylene ethylene carbonate, etc. In some embodiments, the ethylene carbonate containing carbon-carbon double bonds includes vinylene carbonate, which is easy to obtain and can realize more excellent effects.

In some embodiments, the additive includes one or more kinds of compounds containing sulfur-oxygen double bonds. Examples of the compounds containing sulfur-oxygen double bonds may include, but are not limited to, one or more of the following: cyclic sulfate, chain sulfate, chain sulfonate, cyclic sulfonate, chain sulfite, cyclic sulfite, etc.

Examples of the cyclic sulfate may include, but are not limited to, one or more of the following: 1,2-ethanediol sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate, 1,5-pentanediol sulfate, etc.

Examples of the chain sulfate may include, but are not limited to, one or more of the following: dimethyl sulfate, ethyl methyl sulfate, diethyl sulfate, etc.

Examples of the chain sulfonate may include, but are not limited to, one or more of the following: fluorosulfonate such as methyl fluorosulfonate and ethyl fluorosulfonate, methyl methanesulfonate, ethyl methanesulfonate, butyl dimethanesulfonate, methyl 2-(methylsulfonyloxy)propionate, ethyl 2-(methylsulfonyloxy)propionate, etc.

Examples of the cyclic sulfonate may include, but are not limited to, one or more of the following: 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sulfonate, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate, ethylene methanedisulfonate, etc.

Examples of the chain sulfite may include, but are not limited to, one or more of the following: dimethyl sulfite, ethyl methyl sulfite, diethyl sulfite, etc.

Examples of the cyclic sulfite may include, but are not limited to, one or more of the following: 1,2-ethanediol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite, 1,5-pentanediol sulfite, etc.

In some embodiments, the additive includes one or more kinds of anhydride. Examples of the anhydride may include, but are not limited to, one or more of the following: cyclic phosphoric anhydride, carboxylic acid anhydride, disulfonic anhydride and carboxylic acid sulfonic anhydride. Examples of the cyclic phosphoric anhydride may include, but are not limited to, one or more of the following: trimethylphosphoric acid cyclic anhydride, triethylphosphoric acid cyclic anhydride and tripropylphosphoric acid cyclic anhydride. Examples of the carboxylic acid anhydride may include, but are not limited to, one or more of the following: succinic anhydride, glutaric anhydride and maleic anhydride. Examples of the disulfonic anhydride may include, but are not limited to, one or more of the following: ethane disulfonic anhydride and propane disulfonic anhydride. Examples of the carboxylic acid sulfonic anhydride may include, but are not limited to, one or more of the following: sulfobenzoic anhydride, sulfopropionic anhydride and sulfobutyric anhydride.

In some embodiments, the additive is a combination of fluorocarbonate and ethylene carbonate with carbon-carbon double bonds. In some embodiments, the additive is a combination of fluorocarbonate and compounds with sulfur-oxygen double bonds. In some embodiments, the additive is a combination of fluorocarbonate and compounds with 2 to 4 a cyano group(s). In some embodiments, the additive is a combination of fluorocarbonate and cyclic carboxylate. In some embodiments, the additive is a combination of fluorocarbonate and cyclic phosphoric anhydride. In some embodiments, the additive is a combination of fluorocarbonate and carboxylic acid anhydride. In some embodiments, the additive is a combination of fluorocarbonate and ethionic anhydride. In some embodiments, the additive is a combination of fluorocarbonate and carboxylic ethionic anhydride.

Electrolyte

The electrolyte is not particularly limited, and may freely use a known substance capable of being used as the electrolyte. In case of a lithium secondary battery, a lithium salt is generally used. Examples of the electrolyte may include, but are not limited to, an inorganic lithium salt such as $LiPF_6$, $LiBF_4$, $LiClO_4$, $LiAlF_4$, $LiSbF_6$, $LiTaF_6$ and $LiWF_7$; lithium tungstate such as $LiWOF_5$; lithium carboxylate such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$ and $CF_3CF_2CF_2CF_2CO_2Li$; lithium sulfate such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$ and $CF_3CF_2CF_2CF_2SO_3Li$; lithium imide such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic lithium 1,2-perfluoroethane bis(fluorosulfonyl)imide, cyclic lithium 1,3-perfluoropropane bis(fluorosulfonyl)imide and $LiN(CF_3SO_2)(C_4F_9SO_2)$; methylated lithium salts such as $LiC(FSO_2)_3$, $LiC(CF_3SO_2)_3$ and $LiC(C_2F_5SO_2)_3$; lithium (propanedioate) borate such as lithium bis(propanedioate) borate and lithium difluoro(propanedioate) borate; lithium (propanedioate) phosphate such as lithium tris(propanedioate) phosphate, lithium difluoro(propanedioate) phosphate, and lithium tetrafluoro(propanedioate) phosphate; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$; lithium oxalato borate such as lithium difluoro(oxalato)borate and lithium bis(oxalato) borate; and lithium oxalato phosphate such as lithium tetrafluoro oxalato phosphate, lithium difluoro bis(oxalato) phosphate and lithium tris(oxalato) phosphate, etc.

In some embodiments, the electrolyte is selected from $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, cyclic lithium 1,2-perfluoroethane bis(fluorosulfonyl)imide, cyclic lithium 1,3-perfluoropropane bis(fluorosulfonyl)imide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluoro(oxalato)borate, lithium bis(oxalato) borate or lithium difluoro bis(oxalato) phosphate, and is favorable for improving the output power characteristic, the high-power charge and discharge characteristic, the high-temperature storage characteristic, the cycle characteristic and the like of the electrochemical device.

The content of the electrolyte is not particularly limited as long as it does not damage the effect of the present application. In some embodiments, the total molar concentration of lithium in the electrolyte is greater than 0.3 mol/L, greater than 0.4 mol/L, or greater than 0.5 mol/L. In some embodiments, the total molar concentration of lithium in the electrolyte is smaller than 3 mol/L, smaller than 2.5 mol/L, or smaller than 2.0 mol/L. In some embodiments, the total molar concentration of lithium in the electrolyte is within a range formed by any two of the above values. When the concentration of the electrolyte is within the above range, the lithium as charged particles cannot be too little, and additionally, the viscosity can be within a proper range, so that good conductivity can be easily ensured.

In case of using two or more electrolytes, the electrolytes include at least one salt selected from a group consisting of monofluorophosphate, borate, oxalate and fluorosulfonate. In some embodiments, the electrolytes include a salt selected from a group consisting of monofluorophosphate, oxalate and fluorosulfonate. In some embodiments, the electrolytes include a lithium salt. In some embodiments, based on the total weight of the electrolytes, the content of the salt selected from the group consisting of monofluorophosphate, borate, oxalate and fluorosulfonate is greater than 0.01 wt % or greater than 0.1 wt %. In some embodiments, based on the total weight of the electrolytes, the content of the salt selected from the group consisting of monofluorophosphate, borate, oxalate and fluorosulfonate is smaller than 20 wt % or smaller than 10 wt %. In some embodiments, the content of the salt selected from the group consisting of monofluorophosphate, borate, oxalate and fluorosulfonate is within a range formed by any two of the above values.

In some embodiments, the electrolyte includes not less one substance selected from a group consisting of monofluorophosphate, borate, oxalate and fluorosulfonate and not less than one salt else. As the salt else, the lithium salt exemplified above may be used as an example. In some embodiments, the salt else is $LiPF_6$, $LiN(FSO_2)(CF_3SO_2)$, $LiN(CF_3SO_2)_2$, $LiN(C_2F_5SO_2)_2$, cyclic lithium 1,2-perfluoroethane bis(fluorosulfonyl)imide, cyclic lithium 1,3-perfluoropropane bis(fluorosulfonyl)imide, $LiC(FSO_2)_3$, LiC $(CF_3SO_2)_3$, $LiC(C_2F_5SO_2)_3$, $LiBF_3CF_3$, $LiBF_3C_2F_5$, $LiPF_3(CF_3)_3$ and $LiPF_3(C_2F_5)_3$. In some embodiments, the salt else is $LiPF_6$.

In some embodiments, based on the total weight of the electrolyte, the content of the salt else is greater than 0.01 wt % or greater than 0.1 wt %. In some embodiments, based on the total weight of the electrolyte, the content of the salt else is smaller than 20 wt %, smaller than 15 wt %, or smaller than 10 wt %. In some embodiments, the content of the salt else is within a range formed by any two of the above values. The salt else with the above content is favorable for balancing the conductivity and the viscosity of the electrolyte.

In the electrolyte, besides the above solvent, additive and electrolyte salt, additional additives such as an anode covering film forming agent, a cathode protection agent and an overcharge prevention agent may also be contained according to requirements. As the additive, an additive generally used in a non-aqueous electrolyte secondary battery may be used. Examples of the additive may include, but are not limited to, vinylene carbonate, succinic anhydride, biphenyl, phenylcyclohexane, 2,4-difluoroanisole, propane sultone, propene sultone, etc. These additives may be used singly or in any combination. Additionally, the content of these additives in the electrolyte is not particularly limited, and may be properly set according to the types and the like of the additives. In some embodiments, based on the total weight of the electrolyte, the content of the additives is smaller than 5 wt %, within a range of 0.01 wt % to 5 wt %, or within a range of 0.2 wt % to 5 wt %.

III. Anode

The anode includes an anode current collector and an anode mixture layer disposed on one or two surfaces of the anode current collector. The anode mixture layer includes an anode active material layer. The anode active material layer includes an anode active material. The anode active material layer may be one layer or multiple layers. Each of the multiple layers of the anode active material may include identical or different anode active materials. The anode active material is any substance capable of reversibly intercalating and deintercalating metal ions such as lithium ions. In some embodiments, the rechargeable capacity of the anode active material is greater than the discharge capacity of the cathode active material so as to prevent lithium metal from being inadvertently separated on the anode during charging.

For the current collector for maintaining the anode active material, any known current collector may be used. Examples of the anode current collector include, but are not limited to, metal materials such as aluminum, copper, nickel, stainless steel and nickel plated steel. In some embodiments, the anode current collector is copper.

In case of the anode current collector being a metal material, the form of the anode current collector may include, but is not limited to, a metal foil, a metal cylinder, a metal coiled strip, a metal plate, a metal film, a metal lathing, stamped metal, foamed metal, etc. In some embodiment, the anode current collector is a metal film. In some embodiment, the anode current collector is a copper foil. In some embodiment, the anode current collector is a rolled copper foil based on a rolling method or an electrolytic copper foil based on an electrolysis method.

In some embodiments, the thickness of the anode current collector is greater than 1 μm or greater than 5 μm. In some embodiments, the thickness of the anode current collector is smaller than 100 μm or smaller than 50 μm. In some embodiments, the thickness of the anode current collector is within a range formed by any two of the above values.

The anode active material is not particularly limited as long as it is capable of reversibly occluding or releasing lithium ions. Examples of the anode active material may include, but are not limited to, a carbon material such as natural graphite and artificial graphite; metal such as silicon (Si) and stannum (Sn); or an oxide of a metal element such as Si and Sn, etc. The anode active materials may be singly used or combined for use.

The anode mixture layer may further include an anode adhesive. The anode adhesive can improve the binding between particles of the anode active materials and the binding between the anode active material and the current collector. The type of the anode adhesive is not particularly limited as long as it is a material stable in the electrolyte or in the solvent used during manufacturing of the electrode. In some embodiments, the anode adhesive includes a resin adhesive. Examples of the resin adhesive include, but are not limited to, fluororesin, polyacrylonitrile (PAN), polyimide resin, acrylic resin, polyolefin resin, etc. When the aqueous solvent is used for preparing anode mixture slurry, the anode adhesive includes, but is not limited to, carboxymethylcellulose (CMC) or salts thereof, styrene butadiene rubber (SBR), polyacrylic acid (PAA) or salts thereof, polyvinyl alcohol, etc.

The anode may be prepared by the following method: coating the anode mixture slurry containing the anode active material, the resin adhesive and the like onto the anode current collector, performing rolling after drying so as to form the anode mixture layer onto the two sides of the anode current collector, and thus obtaining the anode.

IV. Separator

In order to prevent short circuit, a separator is generally disposed between the cathode and the anode. In this case, the electrolyte of the present application is generally seeped into the separator for use.

The material and the shape of the separator are not particularly limited as long as they do not obviously damage the effect of the present application. The separator may be resin, glass fiber, an organic substance and the like formed by a material stable in the electrolyte of the present application. In some embodiments, the separator includes a porous sheet or a non-woven fabric form substance with excellent liquid preservation performance, etc. Examples of the material of the resin or glass fiber separator may include, but is not limited to, polyolefin, aromatic polyamide, polytetrafluoroethylene, polyether sulfone, a glass filter, etc. In some embodiments, the material of the separator is a glass filter. In some embodiments, the polyolefin is polyethylene or polypropylene. In some embodiments, the polyolefin is polypropylene. The materials of the separator may be used singly or in any combination.

The separator also may be a material laminated by the materials above. Examples of the separator include, but are not limited to, a three-layer separator formed by lamination of polypropylene, polyethylene and polypropylene in a sequence.

Examples of the material of an inorganic substance may include, but are not limited to, oxides such as aluminum oxide and silicon dioxide; nitrides such as aluminum nitride and silicon nitride; and sulfates (such as barium sulfate and calcium sulfate). The form of the inorganic substance may include, but is not limited to, a particle shape or a fiber shape.

The form of the separator may be a film form. Examples of the separator include, but are not limited to, a non-woven fabric, woven cloth, a micro porous film, etc. In the film form, the pore diameter of the separator is 0.01 μm to 1 μm, and the thickness is 5 µm to 50 µm. Besides the above independent film type separator, the following separator may also be used: a separator formed by forming a composite porous layer containing the inorganic substance particles above onto the surface of the cathode and/or the anode by using a resin adhesive, for example, a separator formed by forming 90% aluminum oxide particles with the particle diameter smaller than 1 µm into porous layers onto two sides of the cathode by using fluororesin as the adhesive.

The thickness of the separator is arbitrary. In some embodiments, the thickness of the separator is greater than 1 µm, greater than 5 µm, or greater than 8 µm. In some embodiments, the thickness of the separator is smaller than 50 µm, smaller than 40 µm, or smaller than 30 µm. In some embodiments, the thickness of the separator is within a range formed by any two of the above values. When the thickness of the separator is within the above range, the insulation performance and the mechanical strength can be ensured, and the rate characteristic and the energy density of the electrochemical device can be ensured.

When a porous material such as a porous sheet or a non-woven fabric is used as the separator, the porosity of the separator is arbitrary. In some embodiments, the porosity of the separator is greater than 20%, greater than 35%, or greater than 45%. In some embodiments, the porosity of the separator is smaller than 90%, smaller than 85%, or smaller than 75%. In some embodiments, the porosity of the separator is within a range formed by any two of the above values. When the porosity of the separator is within the above range, the insulation performance and the mechanical strength can be ensured, and the resistance of the separator can be inhibited, so that the electrochemical device has a good rate characteristic.

An average pore diameter of the separator is also arbitrary. In some embodiments, the average pore diameter of the separator is smaller than 0.5 µm or smaller than 0.2 µm. In some embodiments, the average pore diameter of the separator is greater than 0.05 µm. In some embodiments, the average pore diameter of the separator is within a range formed by any two of the values. If the average pore diameter of the separator exceeds the above range, short circuit is easy to occur. When the average pore diameter of the separator is within the above range, the resistance of the separator can be inhibited while the short circuit is prevented, so that the electrochemical device has a good rate characteristic.

V. Electrochemical Device Assembly

An electrochemical device assembly includes an electrode group, a collector structure, an outer shell and a protection element.

Electrode Assembly

The electrode assembly may be any one of a laminated structure formed by laminating the cathode and the anode in a way of being separated by the separator, and a structure formed by coiling the cathode and the anode in a way of being separated by the separator in a vortex manner. In some embodiments, the proportion of the mass of the electrode assembly in the volume in the battery (electrode assembly occupation rate) is greater than 40% or greater than 50%. In some embodiments, the electrode assembly occupation rate is smaller than 90% or smaller than 80%. In some embodiments, the electrode assembly occupation rate is within a range formed by any two of the above values. When the electrode assembly occupation rate is within the above range, the capacity of the electrochemical device can be ensured, meanwhile, reduction of characteristics such as repeated charge and discharge performance and high-temperature storage characteristics accompanying with inside pressure rise can be inhibited, and further the operation of a gas release valve can be prevented.

Collector Structure

The collector structure is not particularly limited. In some embodiments, the collector structure is a structure for reducing the resistance of a wiring part and a connection part. When the electrode assembly is of the above laminated structure, a structure formed by binding a metal core part of each electrode layer into a bundle to be welded onto a terminal is suitable to use. When the electrode area is increased, the inside resistance is increased, so that disposing not less than 2 terminals in the electrode to reduce the resistance is also suitable to use. When the electrode assembly is of the above coiled structure, not less than 2 lead wire structures are respectively disposed at the cathode and the anode, and are bound into bundles onto the terminals, so that the inside resistance can be reduced.

Outer Shell

The material of the outer shell is not particularly limited as long as it is a substance stable in the used electrolyte. The outer shell may use, but is not limited to, metal, such as a nickel plated steel plate, stainless steel, aluminum or aluminum metal and magnesium alloy, or resin and aluminum foil laminated films. In some embodiments, the outer shell is an aluminum or aluminum alloy metal or laminated film.

The metal outer shell includes, but is not limited to, a packaging sealed structure formed by deposition of metals through laser welding, resistance welding and ultrasonic welding; or using a riveting structure formed by the above metals in a way of being separated by a resin gasket. The outer shell using the laminated film includes, but is not limited to, a packaging sealed structure formed by thermally bonding resin layers to each other, etc. In order to improve the sealing performance, resin different from the resin used in the laminated film can also be clamped between the resin layers. When the sealed structure is formed by thermally bonding the resin layers through collector terminals, due to connection between the metal and the resin, resin with polar groups or modified resin imported with the polar groups may be used as clamped resin. Additionally, the shape of the outer shell is also arbitrary, and may be any one of a cylinder shape, a square shape, a laminated shape, a button shape, a big shape and the like.

Protection Element

The protection element may use a positive temperature coefficient (PTC) thermistor with increased resistance during abnormal heat release or passing of too great current, a temperature fuse, a thermistor, a valve (current cutoff valve) for cutting off the current flowing through the circuit by sharply increasing the inside temperature or inside pressure of the battery during abnormal heat release, etc. The protection element may select an element conforming to the condition of not operating in normal use of high current, and may also be designed into a form of not generating abnormal heat release or heat thermal runaway even when no protection element exists.

VI. Application

The electrochemical device of the present application includes any device for undergoing an electrochemical reaction, and specific examples of the electrochemical device include all kinds of primary batteries, secondary batteries, fuel batteries, solar batteries or capacitors. Particularly, the electrochemical device is a lithium secondary battery including a lithium metal secondary battery, a lithium-ion secondary battery, a lithium polymer secondary battery or a lithium-ion polymer secondary battery.

The present application further provides an electronic device including the electrochemical device according to the present application.

The purpose of the electrochemical device of the present application is not particularly limited, and the electrochemical device may be used in any electronic device known in the art. In some embodiments, the electrochemical device of the present application may be used for, but is not limited to, notebook computers, pen-input computers, mobile computers, e-book players, portable phones, portable fax machines, portable copiers, portable printers, head-mounted stereo headphones, video recorders, LCD TVs, portable cleaners, portable CD players, minidisc players, transceivers, electronic notebooks, calculators, memory cards, portable recorders, radios, backup power sources, motors, cars, motorcycles, power bicycles, bicycles, lighting apparatus, toys, game consoles, clocks, electric tools, flash lamps, cameras, large household storage batteries, lithium-ion capacitors, etc.

The lithium-ion battery is taken as an example below to illustrate the preparation of the lithium-ion battery in conjunction with specific embodiments. It will be understood by those skilled in the art that the preparation method described in the present application is merely an example, and any other suitable preparation methods fall within the scope of the present application.

Examples

The performance evaluation of the lithium-ion battery in the examples of the present application and comparative examples is described below.

I. Preparation of Lithium-Ion Battery

1. Preparation of Anode

Artificial graphite, styrene butadiene rubber and sodium carboxymethylcellulose were mixed according to a mass proportion of 96%:2%:2% with deionized water, and stirred uniformly to obtain anode slurry. The anode slurry was coated onto a 12 μm copper foil. Drying, cold pressing, cutting, and tab welding were performed to obtain an anode.

2. Preparation of Cathode

Lithium cobalt oxide ($LiCoO_2$), a conductive material (Super-P) and polyvinylidene fluoride (PVDF) were mixed according to a mass proportion of 95%:2%:3% with N-methylpyrrolidone (NMP). Then, a surfactant was added and uniformly stirred to obtain cathode slurry. The cathode slurry was coated onto a 12 μm aluminum foil. Drying, cold pressing, cutting, and tab welding were performed to obtain a cathode.

In each example of the present application and comparative examples, the dyne value may be realized by a method known in the art, for example, annealing temperature control and plasma processing.

The surfactants used in examples are as shown in the table below:

| Surfactant | HLB | Name (Trade name) |
| --- | --- | --- |
| 1 | 2 | Polyoxyethylene sorbitol beeswax derivative (Atlas G-1706) |
| 2 | 3 | Polyoxyethylene sorbitol beeswax derivative (Atlas G-1704) |
| 3 | 4 | Polyoxyethylene sorbitol beeswax derivative (Arias G-1727) |
| 4 | 5 | Polyoxyethylene sorbitol beeswax derivative (Atlas G-1702) |
| 5 | 6 | Polyoxyethylene sorbitol beeswax derivative (Atlas G-1725) |
| 6 | 7.5 | Polyoxyethylene dioleate (Atlas G-2242) |
| 7 | 8 | Polyoxypropylene mannitol dioleate (Atlas G-2800) |
| 8 | 9 | Polyoxyethylene oxypropylene oleate (Atbs G-2111) |
| 9 | 10 | Polyoxyethylene (5EO) sorbitan monooleate (Tween 81) |

3. Preparation of Electrolyte

In a dry argon gas environment, EC, PC and DEC (weight ratio 1:1:1) were mixed, and $LiPF_6$ was added and uniformly mixed to form a basic electrolyte, wherein the concentration of the $LiPF_6$ was 1.15 mol/L. Different contents of a carboxylic ester and/or additives were added into the basic electrolyte to obtain the electrolytes of different embodiments and comparative examples.

Components of the electrolytes used in the embodiments are as shown in the table below:

| Material name | Abbreviation | Material name | Abbreviation |
| --- | --- | --- | --- |
| Ethylene carbonate | EC | Propylene carbonate | PC |
| Diethyl carbonate | DEC | Ethyl propionate | EP |
| Propyl propionate | PP | γ-butyrolactone | GBL |
| Butanedinitrile | SN | Adiponitrile | ADN |
| Ethylene glycol bis(2-cyanoethyl)ether | EDN | 1,3,6-hexanetricarbonitrile | HTCN |
| 1,2,3-tris(2-cyanoethoxy)propane | TCEP | Lithium difluorophosphate | $LiPO_2F_2$ |

4. Preparation of Separator

A polyethylene (PE) porous polymer film was used as a separator.

5. Preparation of Lithium-Ion Battery

The obtained cathode, separator and anode were sequentially coiled and put into an outer packaging foil, and a liquid injection opening was left. The electrolyte was filled into the liquid injection opening. Work procedures of packaging, formation, capacity and the like were performed to obtain a lithium-ion battery.

II. Test Method

1. Test Method for Dyne Value of Cathode Current Collector

A line was drawn on a surface of a cathode current collector by a dyne pen. After 2 to 3 seconds, whether shrinkage occurs or not and whether the line is condensed into water drop points or not were observed. If the line was condensed into water drops, a dyne pen with a lower value was used to draw a straight line until no shrinkage and no water drop so as to determine a surface tension value of an object. Each sample was at least measured 3 times, abnormal points were eliminated, and an average value was taken as the dyne value of the cathode current collector.

2. Test Method for Length of Burrs on Edge of Cathode Mixture Layer

A distance from a farthest tailing point of the cathode mixture layer to a main body of the cathode mixture layer was measured by a caliper in a gap position of the cathode mixture layer, and caliper data was read as the length of the burrs.

3. Determination Method of Reaction Area (Y) of Cathode Mixture Layer

A surface area meter (a fully automatic surface area determining device manufactured by Ohkura Riken) was used. A sample was pre-dried for 15 min at 350° C. under the nitrogen gas circulation condition. Then, nitrogen helium mixed gas with the nitrogen gas precisely regulated to 0.3 relative to the relative pressure value of the atmospheric pressure was used. The specific surface area (m²/mg) of the cathode mixture layer was determined by a nitrogen adsorption BET single-point method of a gas flowing method. The reaction area (Y) of the cathode mixture layer was calculated through the formula below:

$Y$=specific surface area of cathode mixture layer× weight ($X$) of cathode mixture layer.

4. Test Method for Cycle Capacity Retention Rate of Lithium-Ion Battery

At 45° C., the lithium-ion battery was charged to 4.45 V at 1 C constant current, then charged to 0.05 C current at a 4.45 V constant voltage, and next discharged to 3.0 V at 1 C constant current, and this was used as a first time cycle. The lithium-ion battery was subjected to cycle 200 times according to the above conditions. "1 C" refers to a current value at which the capacity of the lithium-ion battery was completely discharged within 1 hour.

The cycle capacity retention rate of the lithium-ion battery was calculated through the formula below:

Cycle capacity retention rate=(discharging capacity of corresponding cycle time/discharging capacity of first time cycle)×100%.

5. Test Method for Cycle Expansion Rate of Lithium-Ion Battery

At 25° C., the lithium-ion battery was stood for 30 min, then charged to 4.45 V at 0.5 C constant current, next charged to 0.05 C at a 4.45 constant voltage, and stood for 5 min, and then thickness measurement was performed. The lithium-ion battery was subjected to cycle 100 times according to the above conditions, and the thickness after the cycle was measured. The cycle expansion rate of the lithium-ion battery was calculated through the formula below:

Cycle expansion rate=[(thickness after cycle−thickness before cycle)/thickness before cycle]×100%.

III. Test Results

Table 1 shows the influence of the dyne value of the aluminum foil and the length of burrs on the edge of the cathode mixture layer on the performance of the lithium-ion battery.

0.5 wt % of Surfactant 1 was added into the cathode slurry of the examples in Table 1, and no surfactant was added into the cathode slurry of the comparative examples.

TABLE 1

|  | Dyne value (dyn/cm) | Length of burrs (mm) | Cycle capacity retention rate | Cycle thickness expansion rate |
|---|---|---|---|---|
| Comparative Example 1 | 24 | 5 | 56% | 18% |
| Comparative Example 2 | 32 | 5 | 67% | 16% |
| Example 1 | 25 | 4 | 86% | 8% |
| Example 2 | 28 | 3 | 88% | 8% |
| Example 3 | 28 | 2 | 89% | 7.5% |
| Example 4 | 29 | 2 | 89% | 7% |
| Example 5 | 30 | 3 | 88% | 7.8% |
| Example 6 | 31 | 3 | 88% | 8% |
| Example 7 | 31 | 4 | 87% | 8.3% |

As shown in Comparative Examples 1 and 2, when the dyne value of the cathode current collector (aluminum foil) was not within a range of 25 dyn/cm to 31 dyn/cm, and the length of the burrs on the edge of the cathode mixture layer was greater than 4 mm, the cycle capacity retention rate and the cycle thickness expansion rate of the lithium-ion battery were poor.

As shown in Examples 1 to 7, when the dyne value of the cathode current collector (aluminum foil) was within the range of 25 dyn/cm to 31 dyn/cm, and the length of the burrs on the edge of the cathode mixture layer was not greater than 4 mm, the cycle capacity retention rate and the cycle thickness expansion rate of the lithium-ion battery were obviously improved. With the increase of the dyne value of the cathode current collector and the reduction of the length of the burrs, the cycle capacity retention rate of the lithium-ion battery was gradually improved, and the cycle thickness expansion rate was gradually reduced. This was because the increase of the dyne value of the cathode current collector was favorable for improving the cathode coating consistency, and the reduction of the length of the burrs was favorable for improving the uniformity of the cathode slurry, so that side reactions caused in the use of the lithium-ion battery were reduced.

Table 2 shows the influence of the ratios of the thickness of the cathode mixture layer at one side of the cathode current collector (i.e., the single-side thickness of the cathode mixture layer), the thickness of the cathode current collector and the length of the burrs on the cycle performance of the lithium-ion battery.

0.5 wt % of Surfactant 1 was added into the cathode slurry in Examples 8 to 12, and the differences from Example 4 were only the parameters listed in Table 2.

TABLE 2

|  | Single-side thickness of cathode mixture layer (μm) | Thickness of cathode current collector (μm) | Length of burrs (mm) | Single-side thickness of cathode mixture layer/thickness of cathode current collector | Length of burrs/thickness of cathode current collector | Cycle capacity retention rate | Cycle thickness expansion rate |
|---|---|---|---|---|---|---|---|
| Example 4 | 80 | 12 | 2 | 6.7 | 166.7 | 89% | 7% |
| Example 8 | 100 | 12 | 2 | 8.3 | 166.7 | 90% | 6.5% |
| Example 9 | 200 | 12 | 3 | 16.7 | 250.0 | 91% | 7% |
| Example 10 | 250 | 12 | 3 | 20.8 | 250.0 | 92% | 6.8% |
| Example 11 | 300 | 12 | 4 | 25.0 | 333.3 | 88% | 8.2% |
| Example 12 | 500 | 12 | 4 | 41.7 | 333.3 | 83% | 9.5% |
| Comparative Example 1 | 80 | 12 | 5 | 6.7 | 416.7 | 56% | 18% |

Results show that when the ratio of the single-side thickness of the cathode mixture layer to the thickness of the cathode current collector is not greater than 300 and/or the ratio of the length of the burrs to the thickness of the cathode current collector is not greater than 22, the cycle capacity retention rate and the cycle thickness expansion rate of the lithium-ion battery can be further improved.

Table 3 shows the influence of different materials of the cathode current collector on the cycle performance of the lithium-ion battery.

The differences between Examples 13 to 18 and Example 4 were only the variables listed in Table 3.

TABLE 3

| | Material of cathode current collector | Dyne value (dyn/cm) | Length of burrs (mm) | Cycle capacity retention rate | Cycle thickness expansion rate |
|---|---|---|---|---|---|
| Example 4 | Aluminum | 29 | 2 | 89% | 7% |
| Example 13 | Aluminum nickel alloy | 29 | 2 | 90% | 6.5% |
| Example 14 | Aluminum lithium alloy | 29 | 2 | 91% | 6.3% |
| Example 15 | Aluminum microcrystals with cross-section area being 100 μm² | 30 | 1 | 90% | 6.2% |
| Example 16 | Aluminum microcrystals with cross-section area being 80 μm² | 30 | 1 | 91% | 6% |
| Example 17 | Aluminum lithium alloy microcrystals with cross-section area being 100 μm² | 30 | 1 | 92% | 5.5% |
| Example 18 | Aluminum lithium alloy microcrystals with cross-section area being 80 μm² | 30 | 1 | 93% | 5% |

As shown in Examples 4, 13 and 14, as long as the dyne value of the cathode current collector was within the range of 25 dyn/cm to 31 dyn/cm, the material of the cathode current collector was not limited. When the cathode current collector was of aluminum lithium alloy, the strength of the current collector was higher, and the lithium-ion battery did not easily deform, so that the damage to the cathode mixture layer in the cycle process of the lithium-ion battery was reduced, and the cycle capacity retention rate and the cycle thickness expansion rate of the lithium-ion battery were further improved.

As shown in Examples 15 to 18, when the cathode current collector included microcrystals, the cycle capacity retention rate and the cycle thickness expansion rate of the lithium-ion battery were further improved. With the size decrease of the microcrystals, the strength of the current collector was increased, so that the uniformity of the cathode mixture layer was improved, and thus the cycle capacity retention rate and the cycle thickness expansion rate of the lithium-ion battery were further improved.

Table 4 shows the influence of the surfactant on the cycle performance of the lithium-ion battery.

In each example in Table 4, the cathode mixture layer of Example 4 did not include N-methylpyrrolidone, and the cathode mixture layers of Examples 19 to 33 included 80 ppm N-methylpyrrolidone. The differences between Examples 20 to 33 and Example 19 were only the variables listed in Table 4.

TABLE 4

| | Surfactant | | | Cycle capacity retention rate | Cycle thickness expansion rate |
|---|---|---|---|---|---|
| | Type | HLB | Content (wt %) | | |
| Example 4 | 1 | 2 | 0.5 | 89% | 7% |
| Example 19 | 1 | 2 | 0.5 | 92% | 6.5% |
| Example 20 | 1 | 2 | 0.3 | 93% | 5.6% |
| Example 21 | 1 | 2 | 0.2 | 94% | 5.4% |
| Example 22 | 1 | 2 | 0.1 | 95% | 5.2% |
| Example 23 | 1 | 2 | 0.05 | 91% | 5.8% |
| Example 24 | 1 | 2 | 0.01 | 90% | 5.9% |
| Example 25 | 1 | 2 | 0.1 | 96% | 5% |
| Example 26 | 2 | 3 | 0.1 | 96% | 4.8% |
| Example 27 | 3 | 4 | 0.1 | 95% | 4.5% |
| Example 28 | 4 | 5 | 0.1 | 96% | 4.3% |
| Example 29 | 5 | 6 | 0.1 | 95% | 5% |
| Example 30 | 6 | 7.5 | 0.1 | 94% | 5.5% |
| Example 31 | 7 | 8 | 0.1 | 93% | 6% |
| Example 32 | 8 | 9 | 0.1 | 92% | 6.1% |
| Example 33 | 9 | 10 | 0.1 | 90% | 6.3% |

Results show that when the cathode mixture layer included the surfactant, better compatibility could be realized between the cathode mixture layer and the current collector, and the leveling performance of the cathode slurry could be promoted, so that the length of the burrs on the edge of the cathode mixture layer was reduced (i.e., not greater than 4 mm). Meanwhile, due to the existence of the surfactant, the distribution of the cathode active material was more uniform, so that the consistency of the cathode was improved. Based on the above factors, the lithium-ion battery has an excellent cycle capacity retention rate and cycle thickness expansion rate.

Additionally, as shown in Examples 4 and 19, if the cathode mixture layer included N-methylpyrrolidone with the content not greater than 100 ppm, the cycle capacity retention rate of the lithium-ion battery could be further improved, and the cycle thickness expansion rate of the lithium-ion battery could be reduced.

Table 5 shows the influence of the electrolyte on the lithium-ion battery.

The differences between Examples 34 to 48 and Example 4 were only the variables listed in Table 5.

TABLE 5

| | Carboxylic ester (20 wt %) | X | Y | X/Y | Other additives | | Cycle capacity retention rate | Cycle thickness expansion rate |
|---|---|---|---|---|---|---|---|---|
| | | | | | Type | Content (wt %) | | |
| Example 4 | — | — | — | — | — | | 89% | 7% |
| Example 34 | PP | 163 | 8.2 | 20 | — | | 96% | 5.5% |
| Example 35 | PP | 163 | 8.2 | 20 | SN | 4 | 96.5% | 5.3% |
| Example 36 | — | — | — | — | SN | 3 | 93.7% | 6.1% |

TABLE 5-continued

| | Carboxylic ester (20 wt %) | X | Y | X/Y | Other additives Type | Content (wt %) | Cycle capacity retention rate | Cycle thickness expansion rate |
|---|---|---|---|---|---|---|---|---|
| Example 37 | — | — | — | — | HTCN | 3 | 96.8% | 8% |
| Example 38 | PP | 163 | 8.2 | 20 | ADN | 3 | 97.1% | 4.8% |
| Example 39 | PP | 163 | 8.2 | 20 | HTCN | 3 | 97.2% | 4.7% |
| Example 40 | PP | 163 | 8.2 | 20 | SN<br>HTCN | 3<br>1 | 97.3% | 4.6% |
| Example 41 | PP | 163 | 8.2 | 20 | TCEP | 3 | 97.4% | 4.5% |
| Example 42 | PP | 163 | 8.2 | 20 | $LiPO_2F_2$ | 0.5 | 97.5% | 4.3% |
| Example 43 | PP | 163 | 8.2 | 20 | Formula 1-1 | 2 | 98% | 4.2% |
| Example 44 | PP | 163 | 1.6 | 100 | — | — | 90% | 5.5% |
| Example 45 | EP | 163 | 16.3 | 10 | — | — | 93% | 6.2% |
| Example 46 | GBL | 163 | 1.6 | 100 | — | — | 93% | 6.1% |
| Example 47 | EP | 163 | 20.4 | 8 | — | — | 91.2% | 6.7% |
| Example 48 | EP | 163 | 1.6 | 105 | — | — | 90.3% | 6.5% |

Results show that on the basis that the dyne value of the cathode current collector was 25 dyn/cm to 31 dyn/cm, and the length of the burrs on the edge of the cathode mixture layer was not greater than 4 mm, when the content X mg of the carboxylic ester in the electrolyte and the reaction area Y m² of the cathode mixture layer meet the following relationship: 10≤(X/Y)≤100, optimization on the components and content of the electrolyte was favorable for further improving the cycle capacity retention rate and the cycle thickness expansion rate of the lithium-ion battery, and a higher effect could be obtained. Different types of carboxylic ester could achieve basically identical effects.

References to "embodiments", "partial embodiments", "one embodiment", "another example", "example", "specific example" or "partial examples" throughout the specification mean that at least one embodiment or example of the present application includes specific features, structures, materials or characteristics described in the embodiments or examples. Therefore, descriptions appearing throughout the specification, such as "in some embodiments", "in the embodiments", "in one embodiment", "in another example", "in one example", "in a particular example" or "examples", are not necessarily references to the same embodiment or example in the present application. Furthermore, the specific features, structures, materials or characteristics herein can be combined in any suitable manner in one or more embodiments or examples.

Although illustrative embodiments have been shown and described, it will be understood by those skilled in the art that the embodiments are not to be construed as limiting the present application, and modifications, substitutions and changes can be made to the embodiments without departing from the spirit, principle and scope of the present application.

What is claimed is:

1. An electrochemical device, comprising: a cathode, an anode and an electrolyte;
wherein the cathode comprises a cathode current collector and a cathode mixture layer formed on the cathode current collector; a dyne value of the cathode current collector is 25 dyn/cm to 29 dyn/cm; burrs are provided on an edge of the cathode mixture layer, and a length of the burrs is not greater than 4 mm; and the cathode mixture layer comprises a surfactant, and the surfactant has a hydrophilic-lipophilic balance value of 2 to 10;
the cathode mixture layer comprises N-methylpyrrolidone;
based on a total weight of the cathode mixture layer, a content of the N-methylpyrrolidone is not greater than 100 ppm; and
the electrolyte comprises a carboxylic ester; a content X mg of the carboxylic ester in the electrolyte and a reaction area Y m² of the cathode mixture layer meet the following relationship: 10≤(X/Y)≤100.

2. The electrochemical device according to claim 1, wherein the dyne value of the cathode current collector is 26 dyn/cm to 29 dyn/cm, and the length of the burrs is not greater than 3 mm.

3. The electrochemical device according to claim 1, wherein the edge of the cathode mixture layer is an edge of a starting end or an ending end along a coating direction.

4. The electrochemical device according to claim 1, wherein an end part of the cathode mixture layer and an end part of the cathode current collector form a step.

5. The electrochemical device according to claim 1, wherein a ratio of the length of the burrs to a thickness of the cathode current collector is not greater than 300.

6. The electrochemical device according to claim 1, wherein a ratio of a thickness of the cathode mixture layer on one side of the cathode current collector to a thickness of the cathode current collector is not greater than 22.

7. The electrochemical device according to claim 1, wherein a thickness of the cathode current collector is 1 μm to 1 mm.

8. The electrochemical device according to claim 1, wherein the cathode current collector comprises a plurality of microcrystals, the plurality of microcrystals comprise at least one of aluminum microcrystals or aluminum alloy microcrystals, and the plurality of microcrystals have a cross section area not greater than 100 μm².

9. The electrochemical device according to claim 1, wherein the cathode current collector comprises a metal material or a carbon material, and the metal material comprises at least one of aluminum, aluminum alloy, nickel plated aluminum, stainless steel, titanium or tantalum.

10. The electrochemical device according to claim 1, wherein based on a total weight of the cathode mixture layer, a content of the surfactant is not greater than 0.5 wt %.

11. The electrochemical device according to claim 10, wherein the surfactant comprises at least one of a polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, 4,5-polyoxyethylene sorbitan-4,5-oleate, glycerin monostearate, hydroxylated lanolin, sorbitan monooleate, propylene glycol monolaurate, sorbitan monostearate, diethylene glycol monooleate, diethylene glycol monostearate, diethylene glycol fatty acid ester, polyoxyethylene (2EO) oleyl alcohol, methyl glucoside seequisterate, diethylene glycol monolaurate, sorbitan monopalmitate, polyoxyethylene dioleate, tetraethylene glycol monostearate, tetraethylene glycol monooleate, polyoxypropylene mannitol dioleate, a polyoxyethylene sorbitol lanolin oleate derivative, a polyoxyethylene sorbitol lanolin derivative, polyoxypropylene stearate, polyoxyethylene (5EO) lanolin alcohol, sorbitan laurate, polyoxyethylene fatty acid, polyoxyethylene oxypropylene oleate, tetraethylene glycol monolaurate, polyoxyethylene lauryl ether, polyoxyethylene (4EO) sorbitan monostearate, hexaethylene glycol monostearate, propoxylated (5PO) lanolin alcohol, or polyoxyethylene (5EO) sorbitan monooleate.

12. The electrochemical device according to claim 1, wherein the electrolyte comprises a compound with a cyano group(s).

13. The electrochemical device according to claim 12, wherein the compound with the cyano group comprises at least one of butanedinitrile, glutaronitrile, adiponitrile, 1,5-dicyanopentane, 1,6-dicyanohexane, tetramethylsuccinonitrile, 2-methyl pentanedinitrile, 2,4-dimethyl pentanedinitrile, 2,2,4,4-tetramethyl pentanedinitrile, 1,4-dicyanopentane, 1,2-dicyanobenzene, 1,3-dicyanobenzene, 1,4-dicyanobenzene, ethylene glycol bis(propionitrile)ether, 3,5-dioxa-heptanedinitrile, 1,4-bis(cyanoethoxy)butane, diethylene glycol bis(2-cyanoethyl)ether, triethylene glycol bis(2-cyanoethyl)ether, tetraethylene glycol bis(2-cyanoethyl)ether, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxy methylene)ethane, 1,1,1-tris(cyanoethoxy methylene)propane, 3-methyl-1,3,5-tris(cyanoethoxy)pentane, 1,2,7-tris(cyanoethoxy)heptane, 1,2,6-tris(cyanoethoxy)hexane, or 1,2,5-tris(cyanoethoxy)pentane.

14. The electrochemical device according to claim 1, wherein the electrolyte comprises at least one of the following compounds:
(b) lithium difluorophosphate; or
(c) a compound of Formula 1:

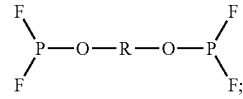

Formula 1 wherein R is a substituted or unsubstituted $C_1$-$C_{10}$ alkyl, and when substituted, a substituent group is halogen.

15. The electrochemical device according to claim 1, wherein the carboxylic ester comprises at least one of a chain carboxylic ester or a cyclic carboxylic ester.

16. The electrochemical device according to claim 1, wherein the carboxylic ester comprises at least one of the following: γ-butyrolactone, γ-valerolactone, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, or ethyl pivalate.

17. An electronic device, comprising an electrochemical device, wherein the electrochemical device comprises a cathode, an anode and an electrolyte; wherein the cathode comprises a cathode current collector and a cathode mixture layer formed on the cathode current collector; a dyne value of the cathode current collector is 25 dyn/cm to 29 dyn/cm; burrs are provided on an edge of the cathode mixture layer, and a length of the burrs is not greater than 4 mm; and the cathode mixture layer comprises a surfactant, and the surfactant has a hydrophilic-lipophilic balance value of 2 to 10;
the cathode mixture layer comprises N-methylpyrrolidone;
based on a total weight of the cathode mixture layer, a content of the N-methylpyrrolidone is not greater than 100 ppm; and
the electrolyte comprises a carboxylic ester; a content X mg of the carboxylic ester in the electrolyte and a reaction area Y m$^2$ of the cathode mixture layer meet the following relationship: $10 \leq (X/Y) \leq 100$.

18. The electronic device according to claim 17, wherein the dyne value of the cathode current collector is 26 dyn/cm to 29 dyn/cm, and the length of the burrs is not greater than 3 mm.

19. The electrochemical device according to claim 1, wherein the dyne value of the cathode current collector is 26 dyn/cm to 29 dyn/cm.

20. The electrochemical device according to claim 14, wherein the electrolyte comprises the compound of Formula 1, and the compound of Formula 1 comprises at least one of 1,2-bis(difluorophosphanyl oxy)ethane, 1,2-bis(difluorophosphanyl oxy)propane or 1,2-bis(difluorophosphanyl oxy)butane.

* * * * *